US012086727B2

(12) United States Patent
Yocam et al.

(10) Patent No.: US 12,086,727 B2
(45) Date of Patent: *Sep. 10, 2024

(54) MODIFIED MEDIA DETECTION

(71) Applicant: T-Mobile USA, Inc., Bellevue, WA (US)

(72) Inventors: Eric Yocam, Sammamish, WA (US); Ahmad Arash Obaidi, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 16 days.

This patent is subject to a terminal disclaimer.

(21) Appl. No.: 17/978,137

(22) Filed: Oct. 31, 2022

(65) Prior Publication Data

US 2023/0053277 A1     Feb. 16, 2023

Related U.S. Application Data

(63) Continuation of application No. 16/915,888, filed on Jun. 29, 2020, now Pat. No. 11,514,342.

(51) Int. Cl.
*H04L 29/00* (2006.01)
*G06F 16/28* (2019.01)
*G06N 5/04* (2023.01)
*G06N 20/00* (2019.01)

(52) U.S. Cl.
CPC ........... *G06N 5/04* (2013.01); *G06F 16/285* (2019.01); *G06N 20/00* (2019.01)

(58) Field of Classification Search
CPC .......... G06N 5/04; G06N 20/00; G06N 5/025; G06F 16/285; G06F 21/64; G06F 16/436
See application file for complete search history.

(56) References Cited

U.S. PATENT DOCUMENTS

2009/0307164 A1   12/2009  Baughman
2017/0364920 A1*  12/2017  Anand ............... H04L 63/0861
2018/0349721 A1*  12/2018  Agrawal ............... G06V 40/45
(Continued)

OTHER PUBLICATIONS

Nicolls, Dean. Will Deepfake Technology Defeat Biometric Authentication?. Jumio, Oct. 10, 2019 [online], [retrieved on Apr. 7, 2020]. Retrieved from the Internet URL: https://www.jumio.com/deepfake-technology-biometric-authentication/.
(Continued)

*Primary Examiner* — Ghazal B Shehni

(57) ABSTRACT

Methods, systems, and apparatus, including computer programs encoded on a computer storage medium, for detecting modified media are disclosed. In one aspect, a method includes the actions of receiving an item of media content. The actions further include providing the item as an input to a model that is configured to determine whether the item likely includes audio of a user's voice that was not spoken by the user or likely includes video of the user that depicts actions of the user that were not performed by the user. The actions further include receiving, from the model, data indicating whether the item likely includes audio of the user's voice that was not spoken by the user or includes video of the user that depicts actions of the user that were not performed by the user. The actions further include determining whether the item likely includes deepfake content.

20 Claims, 9 Drawing Sheets

(56) References Cited

U.S. PATENT DOCUMENTS

| | | | |
|---|---|---|---|
| 2019/0179861 A1 | 6/2019 | Goldenstein et al. | |
| 2019/0391972 A1 | 12/2019 | Bates et al. | |
| 2020/0065526 A1 | 2/2020 | Berman | |
| 2020/0175260 A1* | 6/2020 | Cheng | G06T 7/50 |
| 2021/0097382 A1* | 4/2021 | Mathews | G06N 3/045 |
| 2021/0142782 A1* | 5/2021 | Wolf | G06N 3/08 |
| 2021/0377205 A1 | 12/2021 | Brown et al. | |

OTHER PUBLICATIONS

O'Mara, Deborah L. Deepfakes: New Path to Biometric Hacking?. Electrical Contractor Magazine, Jun. 2019 [online], [retrieved on Apr. 7, 2020]. Retrieved from the Internet URL: https://www.ecmag.com/section/integrated-systems/deepfakes-new-path-biometric-hacking/.

Petersen, John. Combating deepfakes with voice biometric technology. TechRadar, Apr. 24, 2019 [online], [retrieved on Apr. 7, 2020]. Retrieved from the Internet URL: https://www.techradar.com/news/combating-deepfakes-with-voice-biometric-technology/.

U.S. Appl. No. 16/915,888, Non-Final Office Action mailed May 25, 2022, 31 pages.

U.S. Appl. No. 16/915,888, Notice of Allowance mailed Jul. 29, 2022, 34 pages.

\* cited by examiner

MODIFIED MEDIA DETECTION

CROSS-REFERENCE TO RELATED APPLICATION

This application is a continuation of U.S. application Ser. No. 16/915,888, filed Jun. 29, 2020, which is incorporated by reference.

BACKGROUND

A deepfake is an item of media content in which a person in an existing image or video is replaced with someone else's likeness. A deepfake may be generated using machine learning and artificial intelligence to manipulate or generate visual and audio content with a high potential to deceive. A person viewing or listening to a deepfake may believe that the content of the deepfake is real.

Other deepfakes may include modified or synthesized audio that is intended to mimic the voice of someone else and text messaging that appears to be sent by someone else. A speech synthesizer may generate deepfake audio of a transcription, or a voice modification device may modify speech audio to mimic the voice of someone else. A message generation device may spoof the device of someone else so that the recipient believes that person sent the message.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Deepfake media content is designed to deceive the user consuming the media content. The user may believe that a deepfake video includes footage of the subject performing an action, when, in reality, the subject did not perform the action. Similarly, the user may believe that a deepfake voicemail includes audio spoken by the speaker, when the speaker did not speak the audio. The deepfake media content may trick the user into performing an action. For example, the user may be convinced to vote a certain way or perform certain financial transactions.

To assist a user in detecting deepfake media content, a system may use a model trained using data that includes known deepfake media content and known genuine media content. The system may use machine learning to train the model such that the model can receive an unknown item of media content and output data indicating whether the unknown item of media content likely includes deepfake content or is likely genuine. The system can provide the model to a mobile device so that the mobile device can provide the user data indicating the genuineness of an item of media content before, while, or after the user consumes the item of media content. For example, the user may be on a phone call with another user. The mobile device may provide the incoming audio as an input to the model and provide the user with an indication of whether the incoming audio likely includes deepfake content. In some instances, the system can provide the item of media content as an input to the model if the item of media content is a stored file accessible by the system. For example, the system can apply the model to a video clip and determine whether the video clip likely includes deepfake content. When the user views the video clip on the mobile device, the system can also provide data indicating whether the video clip likely includes deepfake content.

Figure 1:
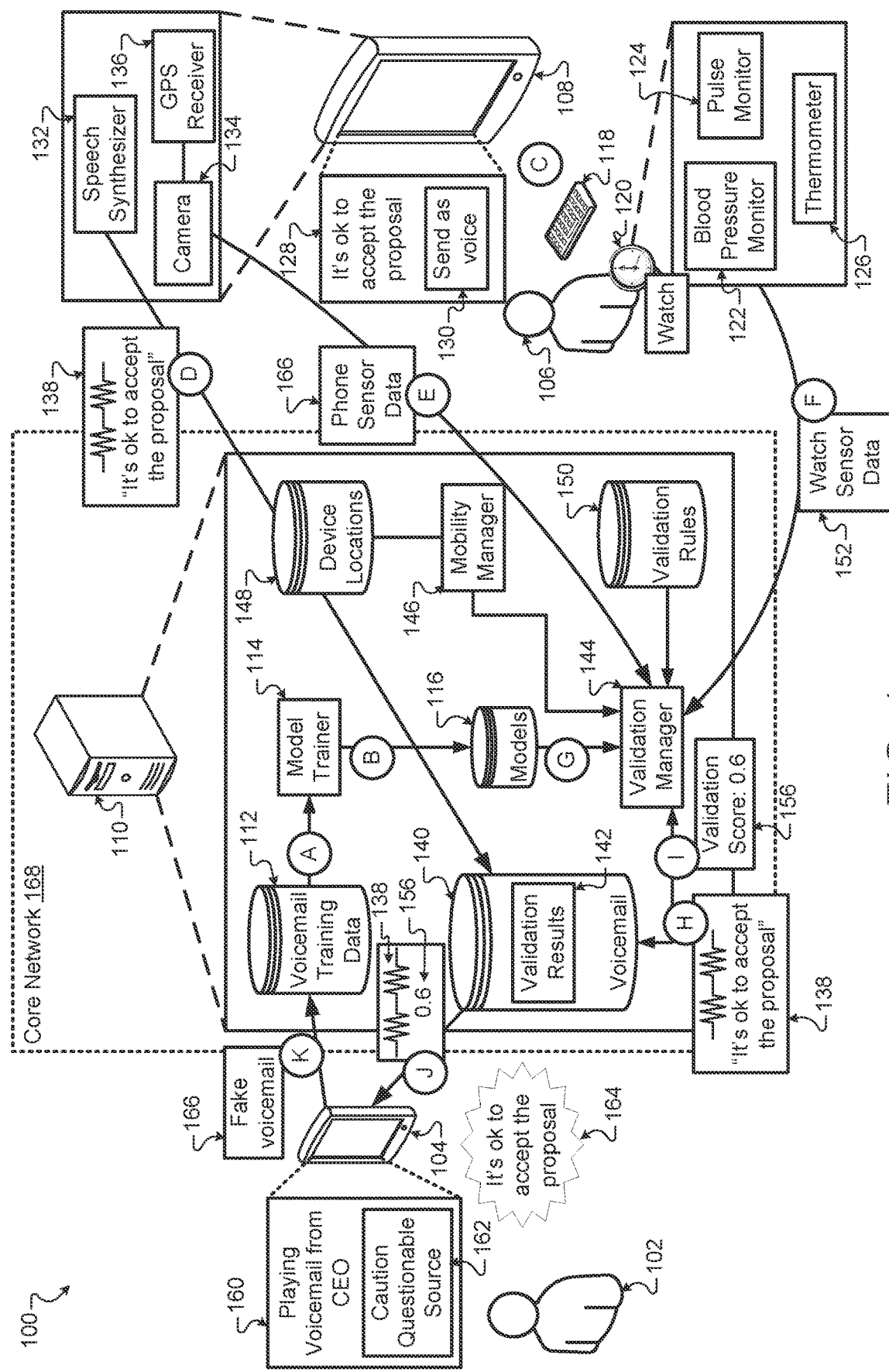
FIG. 1 illustrates an example system for determining whether a voicemail include deepfake media content.

FIG. 1 illustrates an example system 100 for determining whether a voicemail 138 include deepfake media content. Briefly, and as described in more detail below, the user 106 sends the voicemail 138 to the user 102. The network server 110 receives the voicemail 138 and analyzes the voicemail 138. The network server 110 determines that the voicemail 138 may include deepfake media content. The user 102 listens to the voicemail 138 and the user device 104 displays a graphical display 160 indicating that the validity of the voicemail is questionable. While the example shown in FIG. 1 relates to determining whether the voicemail 138 includes deepfake content, the system 100 may be used to determine whether any file includes deepfake content. The file may be stored at the network server 110, the user device 104, or any other similar location. The user 106 may request the file through the user device 104. The file may be the voicemail 138, a video message, a text based message, or any other similar type of file. While the file is being stored, the device storing the file may analyze the file for deepfake content and provide data indicating whether the file likely includes deepfake content when the user 106 requests the file.

In more detail and in stage A, the network server 110 includes a model trainer 114 that is configured to use machine learning to generate a model to determine whether an item of media content includes deepfake content. The model trainer 114 may be software or executable instructions embodied in computer-readable media included in or accessible by the network server 110. The model trainer 114 accesses the training data 112 that includes samples of items of media content that are each labeled as either including deepfake media content or not including deepfake media content. For example, the training data 112 may include multiple genuine samples of items of media content that are each labeled as not including deepfake content. The training data 112 may also include multiple modified samples of items of media content that are each labeled as including deepfake media content.

The training data 112 may include various groups of samples of items of media content. In the example of FIG. 1, the training data 112 includes voicemail samples. The training data 112 may also include samples of video messages, audio-video messages, textual messages, or any other similar type of files. Each of the samples of the training data 112 may include additional data such as data collected from various sensors during the detection or recording of the sample. The sensor data may be collected from sensors of the computing device that detects or records the sample or from a nearby computing device during detection or recording of the sample. The samples in the training data 112 may be grouped according to the data in each sample. For example, one group of samples may include voicemails, blood pressure data, pulse data, thermometer data, image data, and a label indicating whether the voicemail includes deepfake content. Another group may include voicemails, location data, and a label indicating whether the voicemail includes deepfake content. Another group of samples may include video messages and a label indicating whether the video message includes deepfake content. In some implementations, each group of samples may have common characteristics. For example, a group of samples may include voicemails or other messages in the same language. Other groups may include voicemails or other messages collected from the same type of device, voicemails or other messages collected from devices from the same manufacturer, voicemails or other messages that have an elapsed time in a particular range, voicemails or other messages that originate from a same wireless carrier, or other similar groups.

The labeling for each of the samples in the training data 112 may be performed by a computing system that receives input indicating whether each sample includes deepfake content or does not include deepfake content. The computing system may receive the samples by collecting data from a wireless network. In some implementations, the computing system may use a clustering technique to cluster the samples. The computing system may receive input indicating whether each cluster include deepfake content. The samples may include images and voices of many different user, such as 130-140 million users. In some implementations, the training data may include only a subset of the samples from the different users. For example, the subset may include two million samples.

The model trainer 114 generates a model that is configured to receive a file and output data indicating whether the file likely includes deepfake content. The model trainer 114 may train multiple models using each of the different groups of files. For example, the model trainer 114 may train a model using the group of samples that includes voicemails, blood pressure data, pulse data, thermometer data, image data, and a label indicating whether the voicemail includes deepfake content. The resulting model is configured to receive a voicemail, blood pressure data, pulse data, thermometer data, and image data and output data indicating whether the voicemail includes deepfake content. The model trainer 114 may also train a model using the group of samples that includes voicemails, location data, and a label indicating whether the voicemail includes deepfake content. The resulting model is configured to receive a voicemail and location data and output data indicating whether the voicemail includes deepfake content. The model trainer 114 may also train a model using the group of samples that includes video messages and a label indicating whether the video message includes deepfake content. The resulting model is configured to receive a video message and output data indicating whether the video message includes deepfake content.

The model trainer 114 may use various techniques to train the models. Those techniques may include supervised learning, unsupervised learning, semi-supervised learning, reinforcement learning, deep learning, self learning, feature learning, sparse dictionary learning, anomaly detection, robot learning, and/or association rules. The model may use artificial neural networks, decision trees, support vector machines, regression analysis, Bayesian networks, and/or genetic algorithms.

In stage B, the model trainer 114 stores the models in the models storage 116. The model trainer 114 may store data indicating what type of data each model is configured to receive. For example, the model trainer 114 may indicate that a model is configured to receive a voicemail and location data. Another model may be configured to receive a voicemail, blood pressure data, pulse data, thermometer data, and image data. Another model may be configure to receive a video message.

In stage C, the user 106 generates a deepfake file using user device 108. For example, the user 106 may generate a deepfake voicemail 138 using the user device 108. The user device 108 includes an input device 118 that is configured to receive input from the user 106. The input device 118 may be a keyboard or other input device that is separate from the user device 108 or integrated with the user device 108. In some implementations, the user device 108 may use speech recognition to convert audio to the text of the deepfake voicemail 138. The user device 108 outputs a display 128 that includes the text of the deepfake voicemail 138. The user 106 inputs the deepfake voicemail 138. When the user 106 has finished, the user 106 selects the button 130 to convert the text of the deepfake voicemail 138 to speech. The user 106 may also an identifier for the user 102 who will receive the deepfake voicemail 138. The identifier may be a phone number, email address, or other similar identifier.

The user device 108 includes a speech synthesizer 132 that is configured to receive the text of the deepfake voicemail 138 and generate the audio of the deepfake voicemail 138. The speech synthesizer 132 may be software or executable instructions embodied in computer-readable media included in or accessible by the user device 108. In some implementations, the user 106 may indicate a specific voice that the user 106 would like the speech synthesizer 132 to impersonate. The speech synthesizer may be configured to generate speech synthesized speech of various individuals and the user may select a particular person. For example, the user 106 may specify that the speech synthesizer 132 generate the deepfake voicemail 138 in the voice of the company CEO. The speech synthesizer 132 may be configured to generate voicemails using other voices as well.

In some implementations, the user device 108 may generate other types of deepfake content. For example, the user device 108 may be configured to record a video of the user 106 or receive a video of another individual. The user device 108 may modify the video such that the actor in the video appears to be another person. For example, the video may depict user 106 speaking and making gestures. The user device 108 may modify the video so that another person appears to be speaking the same phrase and making the same gestures.

In some implementations, the user device 108 receives genuine content from the user 106. For example, the user device 108 may record a voicemail spoken by the user 106. As another example, the user device 108 may record a video of another person performing an action.

In stage D, the user device 108 transmits the file to the network server 110. The network server 110 may store the file in the storage 140. The storage 140 may be specific for the type of file For example, the user device 108 may transmit the deepfake voicemail 138 and store the deepfake voicemail 138 in the voicemail storage 140. As another example, the user device 108 may transmit a video message and the network server 110 may store the video message in a video message storage. The user device 108 may transmit the deepfake voicemail 138 over a wireless carrier network that includes the network server 110. The deepfake voicemail 138 or any other files with deepfake content may appear similar to a typical voicemail or other files when received by the network server 140. In other words, the network server 110 may have to perform additional processing to determine whether the deepfake voicemail 138 includes any deepfake content.

The wireless carrier network that includes the network server 110 may provide voice and data communication services to multiple user devices, such as the user device 108 and the user device 104. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or other similar standards.

The wireless carrier network may include a radio access network and a core network 168. The network server 110 may be included in the core network 168. The radio access network may include multiple base stations. The multiple base stations are responsible for handling voice and data traffic between multiple user devices, such as the user device 108 and the user device 104, and the core network 168. Accordingly, each of the base stations may provide a corresponding network cell that delivers telecommunication and data communication coverage. The core network 168 may use the network cells to provide communication services to the multiple user devices. For example, the core network 168 may connect the multiple user devices to other telecommunication and data communication networks, such as the Internet and the public switched telephone network (PSTN). The base stations are responsible handling voice and data traffic between user devices and the core network 168. In some implementations, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

In some implementations, the user device 108 may include a camera 134, a GPS receiver 136, and other similar sensors. In stage E, the user device 108 may transmit the phone sensor data 166 collected from these devices to the network server 110. The user device 108 may collect the phone sensor data 166 at periodic intervals, when the user 106 is interacting with the user device 108, and/or in response to a request. The camera 134 may be a front or back facing camera that is configured to capture an image of the user 106 or the environment around the user device 108. The GPS receiver 136 may be configured to determine the location of the user device 108 by receiving data from GPS satellites. In some implementations, the user device 108 may collect and/or transmit the phone sensor data 166 when the user 106 authorizes the user device 108 to collect and/or transmit the phone sensor data 166.

In some implementations, the user 106 may be wearing a watch 120 that is configured to collect data related to the user 106. The watch 120 may include a blood pressure monitor 122, pulse monitor 124, a thermometer 136, and any other similar sensors. In stage F, the watch 120 may transmit watch sensor data 152 collected by the sensors on the watch 120. The watch 120 may collect the watch sensor data 152 at periodic intervals, when the user 106 is interacting with the user device 108, and/or in response to a request. The blood pressure monitor 122 may be configured to monitor the blood pressure of the user 106. The pulse monitor 124 may be configured to monitor the pulse of the user 106. The thermometer 126 may be configure to monitor the temperature of the user 106. In some implementations, the watch 120 may only collect and/or transmit the watch sensor data 152 when the user 106 authorizes the watch 120 to collect and/or transmit the watch sensor data 152.

The network server 110 includes a mobility manager 146 that is configured to monitor the location of the user devices connected to the core network 168. The mobility manager 146 may be software or executable instructions embodied in computer-readable media included in or accessible by the network server 110. The mobility manager 146 may store the locations of the user devices in the device locations storage 148. The mobility manager 146 may collect and store information related to the base station that the user devices are connected to. For example, the user device 108 may be connected to a particular base station. The mobility manager 146 may store data in the device locations storage 148 indicating the time period that the user device 108 was connected to the particular base station.

The network server 110 may include a validation manager 144 that is configured analyze the voicemails in the voicemail storage 140. The validation manager 144 may be software or executable instructions embodied in computer-readable media included in or accessible by the network server 110. The validation manager 144 may also be configured to analyze other files stored in the network server 110 such as video messages, audio video message, textual messages, and any other similar file. The validation manager 144 may be configured to determine whether a voicemail or other similar file likely includes deepfake media content. The validation manager 144 stores the results of the determination in the validation results 142 of the voicemail storage 140. In some implementations, the validation manager 144 generates a validation score that reflects the likelihood that a voicemail includes deepfake media content. For example, the validation manager 144 may generate a validation score from zero to one. In some implementations, the validation manager 144 generates a binary indication of whether the voicemail includes deepfake media content. For example, the validation manager 144 may indicate that the voicemail includes or does not include deepfake media content.

The validation manager 144 may use one or more techniques to determine whether a voicemail likely includes deepfake media content. These techniques may include analyzing the voicemail as well as analyzing any of the phone sensor data 166, the watch sensor data 152, and/or the data from the device locations storage 148. The techniques may include using a machine learning based approach and/or a rules-based approach.

In stage G, the validation manager 144 accesses a model from the models storage 116. The model may be a model trained using machine learning by the model trainer 114. The model may be configured to receive a voicemail and output a validation score that indicates whether the voicemail likely includes deepfake media content or binary data indicating whether the voicemail likely includes deepfake content. The models storage 116 may store additional models trained by the model trainer 114. Other models may be configured to receive a video message, an audio video message, a textual message, or any other similar file and output data indicating whether the file includes deepfake content. Other models may be configured to receive sensor data collected from a user device, wearable device, or any other similar device. The sensor data may be collected during recording of the voicemail, video message, an audio video message, a textual message, or any other similar file.

The validation manager 144 may select a model based on the sensor data collected with the voicemail 138. For example, if the validation manager 144 receives the voicemail 138, image data from the camera 134, and pulse data from the pulse monitor 124, then the validation manager 144 may select a model that is configured to receive a voicemail, image data, and pulse data. If the model storage 116 does not includes a model that is configured to receive a voicemail, image data, and pulse data, then the validation manger 144 may select from the available models. For example, if the models storage 116 includes a model that is configured to receive a voicemail and image data and does not include a model that is configured to receive a voicemail, image data, and pulse data, then the validation manger 144 may select the model that is configured to receive a voicemail and image data.

If the validation manager 144 selects a model that includes a particular type of sensor data as an input, then the validation manager 144 may not adjust the validation score using a validation rule 150 based on that same data. For example, if the validation manager 144 receives phone sensor data 166 that includes image data from the camera 134 and watch sensor data 152 that includes pulse data from the pulse monitor 124, then the validation manager 144 may select a model that requires image data as an input. The validation manager 144 receives a validation score 156 from the selected model. The validation manager 144 may not adjust the validation score 156 based on a validation rule 150 related to image data. The validation manager 144 may adjust the validation score 156 based on a validation rule 150 related to pulse data.

In stage H, the validation manager 144 accesses the voicemail 138 from the voicemail storage 140. The validation manager 144 provides the voicemail 138 as an input to the model. In stage I, the validation manager 144 receives, from the model, a validation score 156 that indicates the likelihood that the voicemail 138 includes deepfake content. For example, the validation manager 144 may determine that the validation score 156 is 0.6, indicating a sixty percent chance that the voicemail 138 includes deepfake content. In some implementations, a validation score 156 of 0.6 may indicate that the validation manager 144 is sixty percent confident that the voicemail 138 includes deepfake content. In some implementations, the validation score 156 may be a binary score that indicates whether the voicemail 138 includes deepfake content. The validation manager 144 may store the validation score 156 in the validation results 142.

In some implementations, the network server 110 includes validation rules 150. The network server 110 may generate the validation rules 150 by analyzing the training data 112. The network server 110 may identify patterns in similar files in the training data 112 and generate a rule based on that pattern. For example, the network server 110 may analyze voicemail samples that include pulse data. The voicemail samples may include both deepfake voicemails and genuine voicemails and each may include pulse data. The network server 110 may identify a pulse pattern that is typically received with the deepfake voicemails and that is not typically received with the genuine voicemails. The pulse pattern may not be received with each deepfake voicemail and may not be absent from pulse data received with the genuine voicemails, but the pulse pattern may be received with a majority of the deepfake voicemails. Based on this, the network server 110 may generate a validation rule that indicates to increase the validation score if the pulse pattern is included in the sensor data received with the voicemail. The network server 110 may generate another validation rule that indicates to decrease the validation score if the pulse pattern is not included in the sensor data received with the voicemail.

As another example, the network server 110 may analyze voicemail samples that include video data. The voicemail samples may include both deepfake voicemails and genuine voicemails and each may include pulse data. The network server 110 may identify an eye movement pattern that is typically present in the user in the video data received with the deepfake voicemails and that is not typically present in the user in the video data received with the genuine voicemails. The eye movement pattern may not be present in the user in the video data received with each deepfake voicemail and may not be absent from video data received with the genuine voicemails, but the eye movement pattern may be present in the user in the video data received with a majority of the deepfake voicemails. Based on this, the network server 110 may generate a validation rule that indicates to increase the validation score if the eye movement pattern is present. The network server 110 may generate another validation rule that indicates to decrease the validation score if the eye movement pattern is not present in any received video data.

The validation manager 144 may apply one or more of the validation rules 150 based on the model selected from the models storage 116. As noted above, the validation manager 144 may select a model from the models storage 116 based on the type of sensor data included in the phone sensor data 166 and the watch sensor data 152. In some instances, the models storage 116 may not include a model that is configured to receive each type of sensor data included in the phone sensor data 166 and the watch sensor data 152. For example, the validation manager 144 may receive a voicemail 138, phone sensor data 166 that includes image data from the camera 134, and watch sensor data 152 that includes blood pressure data from the blood pressure monitor 122. The models storage 116 may not include a model that is configured to receive a voicemail, image data, and blood pressure data. Instead, the models storage 116 may include a model that is configured to receive a voicemail and image data. The validation manager 144 receives a validation score 156 from the model that is configured to receive a voicemail and image data. Because the model was not configured to receive blood pressure data, the validation manager 144 may access a validation rule 150 that specifies how to adjust the validation score 156 based on the blood pressure data. The validation manager 144 may apply the rule to the blood pressure data and adjust the validation score 156 as specified by the validation rule.

In some implementations, the validation manager 144 may not apply one or more of the validation rules 150. As noted above, the validation manager 144 may select a model from the models storage 116 based on the type of sensor data included in the phone sensor data 166 and the watch sensor data 152. The validation manager 144 may receive a voicemail 138 and watch sensor data 152 that includes blood pressure data from the blood pressure monitor 122. The models storage 116 may include a model that is configured to receive a voicemail and blood pressure data. The validation manager 144 receives a validation score 156 from the model that is configured to receive a voicemail and blood pressure data. Because the model was configured to receive the data that the validation manager 144 received, the validation manager 144 may not apply any of the validation rules 150.

In some implementations, the validation manager 144 may not apply one or more of the validation rules 150 because the validation manager 144 may be configured to determine the validation score 156 with the model and without the validation rules. In this case, the validation manager 144 may select a model from the models storage 116 based on the type of sensor data included in the phone sensor data 166 and the watch sensor data 152. The validation manager 144 may receive a voicemail 138 and phone sensor data 166 that includes location data from the GPS receiver 136. The validation manager 144 may select a model that is configured to receive the voicemail 138. The validation manager 144 receives the validation score 156 from the model. The validation manager 144 may take no action regarding the location data.

In some implementations, the validation manager 144 may generate a validation score 156 using the validation rules 150 and without using the models 116. In this case, the validation manager 144 may start with an average or mean of the previous validation scores generated by the validation manager 144. The validation manager may then identify relevant validation rules 150 and apply each of the relevant validation rules 150 to the average or mean validation score. For example, the validation manager 144 may receive a voicemail 138, phone sensor data 166 that includes image data collected from the camera 134, and watch sensor data 152 that includes temperature data from the thermometer 126. The validation manager 144 may start with an average validation score of 0.5. The validation manager 144 may identify a rule related to image data and adjust the validation score based on the rule and the image data. The validation manager 144 may identify a rule related to the temperature data and adjust the validation score based on the rule and the temperature data. The validation manager 144 may store the validation score in the validation results 142.

In stage J, user 102 accesses the voicemail 138 on the user device 104. The user device 104 may receive the voicemail 138 from the voicemail storage 140 of the network server 110. The user device 104 may also receive the validation score 156 from the validation results 142 of the network server 110. In some implementations, when the user device 104 plays the voicemail 138, the user device 104 may display the graphical interface 160. The graphical interface 160 may include the identity of the user who sent the voicemail, according to the network server 110. The graphical interface 160 may also include a validation graphic 162 that includes information related to the validity of the voicemail. Based on which validation score range the validation score 162 falls into, the validation graphic 162 may display the corresponding information. For example, if the validation score 156 is between 0.3 and 0.7, then the validation graphical 162 may indicate that the source of the voicemail 138 is questionable. In some implementations, the voicemail 138 may include a binary indicator regarding the validity of the voicemail 138. In this case, the validation graphic 162 may indicate whether the source of the voicemail 138 is real or fake.

The user 102 may listen to the voicemail 138. The audio 164 of the voicemail 138 may sound like the sender of the voicemail 138 as identified on the graphical interface 160. Depending on the data displayed on the validation graphic 162, the user 102 may wish to confirm the validity of the voicemail 138. The user 102 may reach out to the sender of the voicemail 138 as identified on the graphical interface 160 through an alternative communication channel. For example, if the user 102 receives a voicemail, then the user 102 may communicate with the sender of the voicemail 138 as identified on the graphical interface 160 through email. The user 102 may receive information confirming the validity of the voicemail 138 or information indicating that the voicemail 138 is not valid. For example, the user 102 may call the person identified on the graphical interface 160 and receive information 166 indicating that the voicemail 138 is fake.

In stage K, the user 102 may provide this information 166 to the network server 110. The network server 110 may store the information 166 along with the voicemail 138 in the voicemail training data 112. The model trainer 114 may retrain the model with the additional voicemail training data 112 and store the updated model in the models storage 116. When the validation manager 144 analyzes another voicemail, the validation manager 144 may use the updated model.

In some implementations, the training data 112, the type of data that each model is configured to receive, the data specified by each validation rule 150, and the data received and analyzed by the validation manager 144 may include additional types of data. These additional types of data may include the phone number of the user device 108, the time of day that the user device 108 transmits the voicemail, the location of the base station to which the user device 108 is connected, the last time that the user device 108 received a new SIM card, the frequency with which the user device 108 has swapped SIM cards, and other similar types of data, a route that the data takes between the user device 108 and the network server 110, and a number of servers or other devices that route the data from the user device 108 to the network server 110. For example, a group of samples in the training data 112 may include the phone number of the device. In this case, the model trainer 114 may train a model that is configured to receive the phone number of the device in addition to the other types of data in the samples. If the validation manager 144 receives the phone number of the device, then the validation manager 144 may select a model that is configured to receive the phone number.

As another example, the network server 110 may generate a validation rule 150 based on one of these types of data. The training data 112 may include a group of samples that indicates the frequency with which the device swaps SIM cards. Based on analyzing SIM swapping patterns, the network server 110 may generate a validation rule indicating that if the SIM swapping frequency is greater than a threshold amount, then the data is more likely to include deepfake content. The training data 112 may also include a group of samples that indicates the route that the data takes between the user device 108 and the network server 110. Based on analyzing the routing patterns, the network server 110 may generate a validation rule indicating that if a route includes a particular server, node, or other device, then the data is more likely to include deepfake content. This rule may help to prevent man-in-the-middle attacks.

In some implementations, some of the processing that occurs on the network server 110 may occur on the user device 104 and vice versa. For example, the user device 104 may include a model trainer 114 that accesses the training data 112. The models trained by a model trainer on the user device 104 may be stored in a models storage on the user device 104 or transmitted back to the network server 110. The user device 104 may include a validation manager 144. The validation manager of the user device 104 may receive the voicemail 138, the phone sensor data 166, and the watch sensor data 152 from the network server 110. The validation manager of the user device 104 may generate a validation score and store the validation score on the user device 104.

The network server 110 may be configured to generate a graphical interface based on the validation results 142 and transmit the graphical interface to the user device 104 along with the voicemail 138. In this case, the network server 110 may not transmit the validation score 156 to the user device 104.

Figure 2:
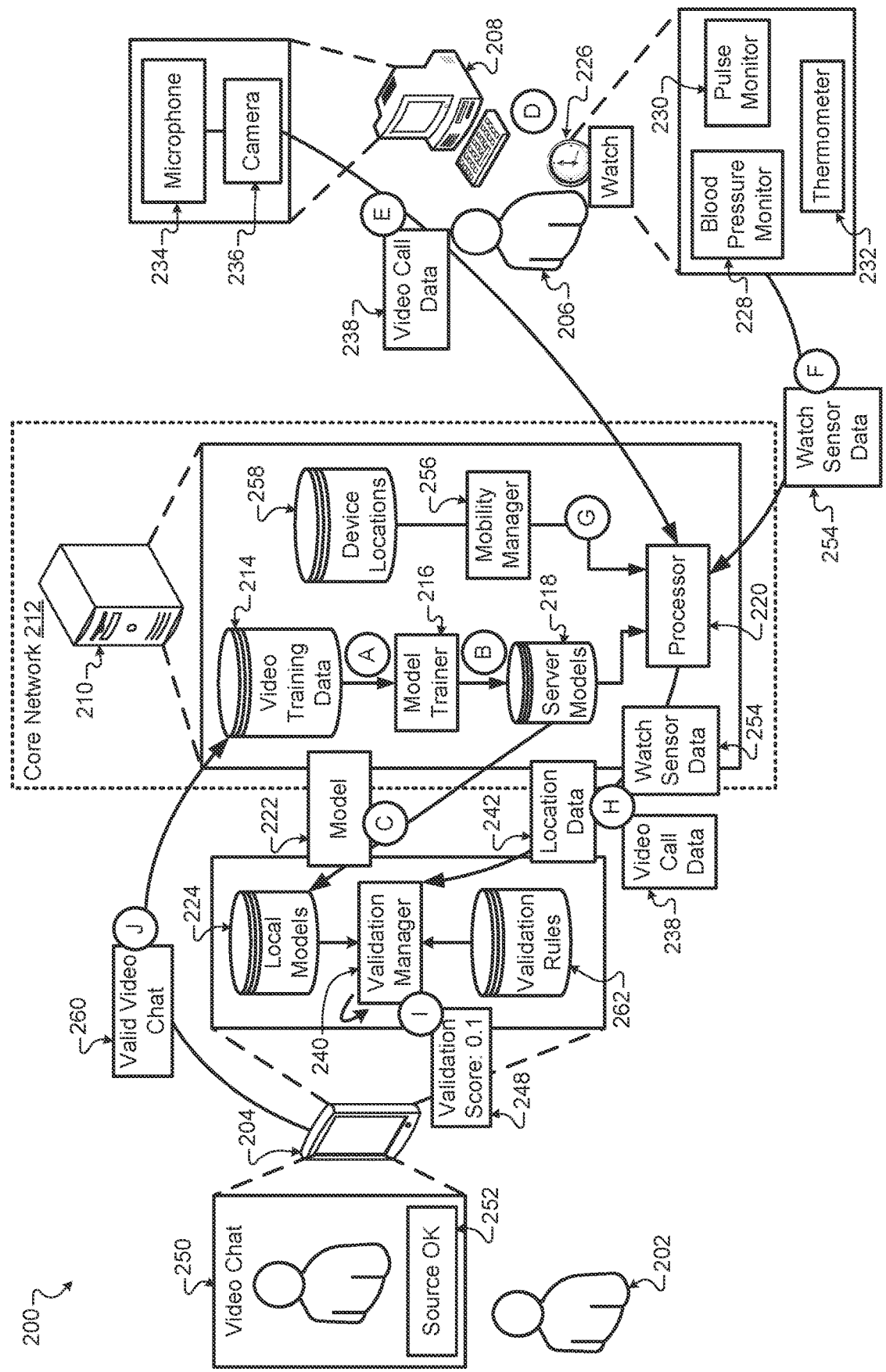
FIG. 2 illustrates an example system for determining whether the video call data of a video call includes deepfake media content.

FIG. 2 illustrates an example system 200 for determining whether the video call data 238 of a video call includes deepfake media content. Briefly, and as described in more detail below, the user 206 and the user 202 are having a video call. The network server 210 may receive and transmit the video call data 238 between the computing device 208 and the user device 204. The user device 204 may continuously analyze the video call data 238 and provide a graphical indicator 252 indicating the validity of the video call. While the example shown in FIG. 2 relates to determining whether a video call includes deepfake content, the system 200 may be used to determine whether any streaming data includes deepfake content. The streaming data may be provided by the computing device 208 to the network server 210, and the network server 210 may provide the streaming data to the user device 204, or any other similar location. The streaming data may include other real-time communication techniques such as a telephone call, real-time messaging, or other similar communication type.

In more detail and in stage A, the network server 210 includes a model trainer 216 that is configured to use machine learning to generate a model to determine whether the streaming data of a video call includes deepfake media content. The model trainer 216 may be software or executable instructions embodied in computer-readable media included in or accessible by the network server 210. The model trainer 216 accesses the video training data 214 that includes video call samples that are each labeled as either including deepfake media content or not including deepfake media content. For example, the video training data 214 may include a genuine video and corresponding audio of an individual who was participating in a video call and a label indicating that the video and audio does not include any deepfake media content. Another sample in the video training data 214 may include the video and corresponding audio of another individual who was also participating in the same video call and a label indicating that the video and audio does not include any deepfake media content. The video training data 214 may also include video and corresponding audio of a video call and a label that the video and audio include deepfake media content. The samples in the video training data may be of varying lengths.

The training data 214 may include various groups of streaming media samples. In the example of FIG. 2, the training data 214 includes video call samples. The training data 214 may also include samples of telephone calls, streaming messaging, or any other similar type of streaming media. Each of the samples of the training data 214 may include additional data such as data collected from various sensors during the detection or recording of the streaming media sample. The sensor data may be collected from sensors of the computing device that detects or records the streaming media sample or from a nearby computing device during detection or recording of the streaming media sample. The streaming media samples in the training data 214 may be grouped according to the data in each sample. For example, one group of samples may include video call samples, blood pressure data, pulse data, thermometer data, image data, and a label indicating whether the video call sample includes deepfake content. Another group may include video call samples, location data, and a label indicating whether the video call sample includes deepfake content. Another group of samples may include telephone call samples and a label indicating whether each telephone call sample includes deepfake content. In some implementations, each group of samples may have common characteristics. For example, a group of samples may include video call samples or other samples in the same language. Other groups may include video call samples or other samples collected from the same type of device, video call samples or other samples collected from devices from the same manufacturer, video call samples or other samples that originate from a same wireless carrier, or other similar groups.

In some implementations, each group of samples may include streaming media samples of varying lengths from the same communication event. The training data 214 may include a sample of an initial portion of a streaming media sample, another sample of the initial portion and a following portion of the streaming media sample, another sample may include the initial portion, the following portion, and another following portion of the streaming media sample. For example, the training data 214 may include multiple samples from a single telephone call. A first sample may include the first ten seconds of the telephone call and any concurrently detected sensor data. A second sample may include the first twenty seconds of the telephone call and any concurrently detected sensor data. A third sample may include the first thirty seconds of the telephone call and any concurrently detected sensor data. The samples may continue to increase in duration until the training data 214 includes a sample that includes the entire length of the telephone call.

The model trainer 216 generates a model that is configured to receive streaming media and output data indicating whether the file likely includes deepfake content. The model trainer 216 may train multiple models using each of the different groups of files. For example, the model trainer 216 may train a model using the group of samples that includes video call data, blood pressure data, pulse data, thermometer data, image data, and a label indicating whether the video call sample includes deepfake content. The resulting model is configured to receive video call data, blood pressure data, pulse data, thermometer data, and image data and output data indicating whether the video call data includes deepfake content. The model trainer 216 may also train a model using the group of samples that includes video call data, location data, and a label indicating whether the video call data includes deepfake content. The resulting model is configured to receive video call data and location data and output data indicating whether the video call data includes deepfake content. The model trainer 216 may also train a model using the group of samples that includes telephone calls and a label indicating whether the telephone call includes deepfake content. The resulting model is configured to receive telephone call data and output data indicating whether the telephone call data includes deepfake content.

Each of the models may be configured to receive the input of various lengths and at various intervals during the communication event. A model may receive the first portion of the streaming data of a communication event and any concurrent sensor data. The model may then receive the first portion and a second portion of the streaming data of the communication event and any concurrent sensor data. The model may continue to cumulative receive input of increasing lengths until the validation score satisfies a threshold, until the communication event ends, and/or until the network server 210 stops providing input to the model.

The model trainer 216 may use various techniques to train the models. Those techniques may include supervised learning, unsupervised learning, semi-supervised learning, reinforcement learning, deep learning, self learning, feature learning, sparse dictionary learning, anomaly detection, robot learning, and/or association rules. The model may use artificial neural networks, decision trees, support vector machines, regression analysis, Bayesian networks, and/or genetic algorithms.

In stage B, the model trainer 216 stores the model in the server models storage 218. The model trainer 216 may store data indicating what type of data each model is configured to receive. For example, the model trainer 216 may indicate that a model is configured to receive video call data and location data. Another model may be configured to receive video call data, blood pressure data, pulse data, thermometer data, and image data. Another model may be configured to receive telephone call data.

In stage C, the network server 210 provides the model 222 to the user device 204. The model 222 may be configured to receive video call data 238 and output data indicating whether the video call data 238 includes deepfake media content. The network server 210 may store a copy of the model 222 in the server models storage 218 and provide a copy of the model 222 to the user device 204. The user device 204 stores the model 222 in the local models storage 224. The network server 210 may also provide data indicating what type of input the model 222 is configured to receive. For example, the model 222 may be configured to receive video call data, blood pressure data, pulse data, thermometer data, and image data.

In some implementations, the network server 210 provides multiple models to the user device 204. Each of the models may be configured to receive a different types of communication data and/or sensor data. For example, a model may be configured to receive video call data and location data. Another model may be configured to receive telephone call data. The network server 210 may provide the user device 204 data indicating what type of data each model is configured to receive.

In stage D, the user 206 and the user 202 initiate a video call. The user 206 may participate in the video call using computing device 208. The computing device 208 may be a desktop computer, laptop computer, phone, tablet, or any other type of device that is capable of conducting a video call. The user 202 may participate in the video call using the user device 204. The user device 204 may be a desktop computer, laptop computer, phone, tablet, or any other type of device that is capable of conducting a video call.

The user device 204 and the computing device 208 may be communicating over a wireless carrier network that includes the network server 210. The wireless carrier network may provide voice and data communication services to multiple user devices, such as the user device 204 and the computing device 208. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or other similar standards.

The wireless carrier network may include a radio access network and a core network 212. The network server 210 may be included in the core network 212. The radio access network may include multiple base stations. The multiple base stations are responsible for handling voice and data traffic between multiple user devices, such as the user device 204 and the computing device 208, and the core network 212. Accordingly, each of the base stations may provide a corresponding network cell that delivers telecommunication and data communication coverage. The core network 212 may use the network cells to provide communication services to the multiple user devices. For example, the core network 212 may connect the multiple user devices to other telecommunication and data communication networks, such as the Internet and the public switched telephone network (PSTN). The base stations are responsible handling voice and data traffic between user devices and the core network 212. In some implementations, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

The video call between the user 202 and the user 206 may be a real-time video call such that audio and video captured by the computing device 208 is transmitted through the network server 210, received by the user device 204, and displayed by the user device 204 on the graphical interface 250 with minimal delay. Similarly, audio and video captured by the user device 204 is transmitted through the network server 210, received by the computing device 208, and displayed by the computing device 208 on a graphical interface with minimal delay.

The computing device 208 may be configured to communicate with the user device 204 and other devices in different manners. The computing device 208 may be configured to record the user 206 during a video call and modify the video call data to generate a deepfake video call. In this way, the image and/or voice of the user 206 appears to be that of another person. The computing device 208 may transmit the deepfake video call data to the network server 210 in a similar manner to the video call data 208. The computing device 208 may also be configured to conduct a telephone call and/or modify telephone call data to generate a deepfake telephone call.

The computing device 208 includes a microphone 234 and a camera 236. The microphone 234 is configured to capture audio, such as the speech of the user 206. The camera is configured to capture video data, such as an image of the user 206. In stage E, the computing device 208 transmits the video call data 238 that includes the audio and video data to the network server 210. The computing device 208 may continuously transmit additional video call data 238 during the video call. The computing device 208 may cease transmitting the video call data 238 when the video call is terminated by the user 206, the user 202, or another way. In some implementations, the computing device 208 may include an additional camera. The camera 236 may be used to capture the video data for the video call. The other camera may record video and that video may be analyzed by the validation manager 240. In some implementations, the validation manager 240 may analyze the video data from both cameras.

In some instances, the user 206 may be wearing a watch 226 or another wearable device. The watch 226 may be configured to collect data related to the user 206. The watch 226 includes a blood pressure monitor 228, a pulse monitor 230, a thermometer 232, and other similar sensors. In stage F, the watch 226 may transmit watch sensor data 254 collected by the sensors on the watch 226. The watch 226 may collect the watch sensor data 254 at periodic intervals, when the user 206 is interacting with the computing device 208 (e.g., during the video call), and/or in response to a request. The blood pressure monitor 228 may be configured to monitor the blood pressure of the user 206. The pulse monitor 230 may be configured to monitor the pulse of the user 206. The thermometer 232 may be configure to monitor the temperature of the user 206. In some implementations, the watch 226 may only collect and/or transmit the watch sensor data 254 when the user 206 authorizes the watch 226 to collect and/or transmit the watch sensor data 254.

The network server 210 includes a mobility manager 256 that is configured to monitor the location of the devices connected to the core network 212. The mobility manager 256 may be software or executable instructions embodied in computer-readable media included in or accessible by the network server 210. The mobility manager 256 may store the locations of the devices in the device locations storage 258. The mobility manager 256 may collect and store information related to the base station that the user devices are connected to. For example, the computing device 208 may be connected to a particular base station. The mobility manager 256 may store data in the device locations storage 258 indicating the time period that the user device 208 was connected to the particular base station.

The network server 210 includes a processor 220 that is configured to manage data being exchanged between the computing device 208 and the user device 204. In stage G, the processor 220 receives the location data 242 from the mobility manager 256. The mobility manager 256 may continuously provide location data 242 to the processor 220 while the network server 210 is managing the video call between the computing device 208 and the user device 204. The mobility manager 256 may determine the location of the computing device 208 and transmit that location In some implementations, the location data 242 may include timestamp data to indicate the location of the computing device 208 at various points in time. In some implementations, the processor 220 may request location data 242 from the mobility manager 256 in response to receiving the video call data 238 from the computing device 208. In some implementations, the mobility manager 256 may provide location data 242 to the processor 220 in response to detecting a change in location of the computing device 208.

In stage H, the network server 210 provides the location data 242, the video call data 238, and the watch sensor data 254 to the user device 204. In some implementations, the network server 210 may not receive the watch sensor data 254 because the user 206 is not wearing a watch or the user 206 declined to provide the watch sensor data 254. The network server 210 may continuously provide the location data 242, the video call data 238, and the watch sensor data 254 during the video call. As the user 206 is talking in front of the camera 236, the computing device 208 transmits the video call data 238. During the video call, the watch 226 may continuously provide the watch sensor data 254, and the mobility manager 256 may continuously provide the location data 242.

In stage I, the validation manager 240 analyzes the location data 242, the video call data 238, and the watch sensor data 254 to determine whether the video call data 238 likely include deepfake media content. The model trainer 240 may be software or executable instructions embodied in computer-readable media included in or accessible by the user device 204. The validation manager 240 may also be configured to analyze other communication data that is continuously received from the network server 210 such as telephone calls, real-time textual messages, and any other similar communication data. The validation manager 240 may access a model from the local models 224. The model may be configured to receive video call data and output data indicating whether the video call data includes deepfake content or binary data indicating whether the video call data includes deepfake content.

The local models 224 may store additional models trained by the model trainer 216. Other models may be configured to receive telephone call data, real-time messaging data, or any other similar communication data and output data indicating whether the communication data includes deepfake content. Each of the models may be configured to receive different types of sensor data. For example, some models may be configured to receive sensor data collected from a user device, wearable device, or any other similar device. The sensor data may be collected during the video call, telephone call, or other similar communication.

The validation manager 240 may provide the video call data 238 as an input to the model. The output from the model includes a validation score 248 indicating the likelihood that the video call data 238 includes deepfake media content. The validation manager may display a validation graphic 252 on the graphical interface 250 indicating whether the image and/or audio of the video call likely includes deepfake media content.

Because the video call is a real-time, the network server 210 may continuously receive, from the computing device 208, and provide, to the user device 204, the location data 242, the video call data 238, and the watch sensor data 254. When the video call is initiated, and the computing device 208 begins providing the location data 242, the video call data 238, and the watch sensor data 254, the user device 204 may receive the location data 242, the video call data 238, and the watch sensor data 254 and begin providing the video call data 238 to the model from the local models 224. The model outputs an initial validation score indicating whether the video call data 238 likely includes deepfake media content. This initial validation score may indicate that the model is not confident whether the video call data 238 likely includes deepfake media content because the model has not received enough video call data 238 to increase or decrease the validation score. For example, if the user 202 and the user 206 have been conducting the video call for one second, then the validation manager 240 has only received one second of video call data 238. Based on that one second of video call data 238, the model may indicate that the validation score is 0.5, indicating that it is just as likely that the video call data 238 includes deepfake media content as not including deepfake media content.

As the video call continues, the user device 204 may receive more location data 242, video call data 238, and watch sensor data 254 and provide the additional video call data 238 to the model. As the model receives more data, the validation score may indicate that the model is more confident that video call data 238 includes or does not include deepfake media content. For example, after ten seconds of receiving the video call data 238, the model may output a validation score of 0.3. After thirty seconds of receiving the video call data 238, the model may output a validation score of 0.1.

As the model updates the validation score 248, the validation manager 240 may update the validation graphic 252. For example, if the validation score is 0.5 after one second, then the validation graphic 252 may indicate "Source Unknown." If the validation score is 0.3 after ten seconds, then the validation graphic 252 may indicate "Source Unknown/OK." If the validation score is 0.1 after thirty seconds, then the validation graphic 252 may indicate "Source OK."

In some implementations, the user device 204 includes validation rules 262. The network server 210 and/or the user device 204 may generate the validation rules 262 by analyzing the training data 214. The network server 210 and/or the user device 204 may identify patterns in similar files in the training data 214 and generate a rule based on that pattern. For example, the network server 210 and/or the user device 204 may analyze telephone call samples that include pulse data. The telephone call samples may include both deepfake audio and genuine audio and each may include pulse data. The network server 210 and/or the user device 204 may identify a pulse pattern that is typically received during the deepfake telephone calls and that is not typically received during the genuine telephone calls. The pulse pattern may not be received during each the deepfake telephone call and may not be absent from pulse data received during each the genuine telephone call, but the pulse pattern may be received with a majority of the deepfake telephone calls. Based on this, the network server 210 and/or the user device 204 may generate a validation rule that indicates to increase the validation score if the pulse pattern is included in the sensor data received with the telephone call data. The network server 210 and/or the user device 204 may generate another validation rule that indicates to decrease the validation score if the pulse pattern is not included in the sensor data received with the telephone call data.

As another example, the network server 210 and/or the user device 204 may analyze video call samples. The video call samples may include both deepfake video call samples and genuine video call samples. The network server 210 and/or the user device 204 may identify an eye movement pattern that is typically present in the user in the deepfake video call samples and that is not typically present in the genuine video call samples. The eye movement pattern may not be present in the user in each deepfake video call sample and may not be absent from each genuine video call sample, but the eye movement pattern may be present in the majority of the deepfake video call samples. Based on this, the network server 210 and/or the user device 204 may generate a validation rule that indicates to increase the validation score if the eye movement pattern is present. The network server 210 and/or the user device 204 may generate another validation rule that indicates to decrease the validation score if the eye movement pattern is not present in any received video data.

The validation manager 240 may apply one or more of the validation rules 262 based on the model selected from the local models 224. As noted above, the validation manager 240 may select a model from the local models 224 based on the type of communication data received, the presence of the location data 242, and/or the type of sensor data included in the watch sensor data 254. In some instances, the local models 224 may not include a model that is configured to receive each type of sensor data included in the watch sensor data 254. For example, the validation manager 240 may receive video call data 238 and watch sensor data 254 that includes blood pressure data from the blood pressure monitor 228 and pulse data from the pulse monitor 230. The local models 224 may not include a model that is configured to receive video call data, pulse data, and blood pressure data. Instead, the models storage 116 may include a model that is configured to receive video call data and pulse data. The validation manager 240 receives a validation score 248 from the model that is configured to receive a voicemail and pulse data. Because the model was not configured to receive blood pressure data, the validation manager 240 may access a validation rule 262 that specifies how to adjust the validation score 248 based on the blood pressure data. The validation manager 240 may apply the rule to the blood pressure data and adjust the validation score 248 as specified by the validation rule.

In some implementations, the validation manager 240 may not apply one or more of the validation rules 262. As noted above, the validation manager 240 may select a model from the local models 224 based on the type of communication data received, the presence of the location data 242, and/or the type of sensor data included in the watch sensor data 254. The validation manager 240 may receive a video call data 238 and watch sensor data 254 that includes blood pressure data from the blood pressure monitor 228. The local models 224 may include a model that is configured to receive video call data and blood pressure data. The validation manager 240 receives a validation score 248 from the model that is configured to receive video call data and blood pressure data. Because the model was configured to receive the data that the validation manager 240 received, the validation manager 240 may not apply any of the validation rules 262.

In some implementations, the validation manager 240 may not apply one or more of the validation rules 262 because the validation manager 240 may be configured to determine the validation score 248 with the model and without the validation rules. In this case, the validation manager 240 may select a model from the local models 224 based on the type of communication data received, the presence of the location data 242, and/or the type of sensor data included in the watch sensor data 254. The validation manager 240 may receive a video call data 238 and location data 242. The validation manager 240 may select a model that is configured to receive the video call data 238. The validation manager 240 receives the validation score 248 from the model. The validation manager 240 may take no action regarding the location data.

In some implementations, the validation manager 240 may generate a validation score 248 using the validation rules 262 and without using the models 224. In this case, the validation manager 240 may start with an average or mean of the previous validation scores generated by the validation manager 240. The validation manager 240 may identify relevant validation rules 262 and apply each of the relevant validation rules 262 received data and adjust the average or mean validation score. For example, the validation manager 240 may receive video call data, location data 242, and watch sensor data 254 that includes temperature data from the thermometer 232. The validation manager 240 may start with an average validation score of 0.5. The validation manager 240 may identify a rule related to temperature data and adjust the validation score based on the rule and the temperature data. The validation manager 240 may identify a rule related to the location data and adjust the validation score based on the rule and the location data. The validation manager 240 adjust the validation graphic 252 based on the resulting validation score.

The validation manager 240 may use any of these techniques of using the local models 224 and/or the validation rules 262 to generate a validation score 248. The validation manager 240 may continuously analyze the video call data 238, the location data 242, and/or the watch sensor data 254 using the local models 224 and/or the validation rules 262 as the validation manager 240 receives additional video call data 238, location data 242, and/or watch sensor data 254. For example, the validation manager 240 may cumulatively provide the video call data 238, the location data 242, and/or the watch sensor data 254 to a model of the local models 224 and/or to a rule of the validation rules 262.

During the video call, the validation manager 240 or another component of the user device 204 may generate a validation graphic 252 based on the validation score 248. The validation graphic 252 may graphical indicate the likelihood that the video call data 238 includes deepfake content. The validation graphic 252 may be located on the graphical interface 250 of the video call. Based on changes in the validation score 248 during the video call, the validation manager 240 adjusts the validation graphic 252. The user 202 may decide to continue the video call if the validation graphic 252 indicates that the source is ok. The user may decide to terminate the video call if the validation graphic 252 indicates that the source is questionable or probably a deepfake.

After or during the video call, the user 202 may contact the user 206 through an alternate communication channel, such as a phone call, instant message, email, or any other similar communication channel. The user 202 may receive information related to the validity of the video call. For example, the user 206 may confirm that the user 206 participated in the video call by asking the user 206 on a telephone call.

In stage J, the user 202 may provide validity information 260 to the network server 210. The network server 210 may store the information 214 along with the video call data 238 in the video training data 214. The model trainer 216 may retrain the model with the additional video training data 214 and store the updated model in the server models storage 218 and provide the updated model to the user device 204, where the user device 204 stores the updated model in the local models storage 224. When the validation manager 240 analyzes another video call, the validation manager 240 may use the updated model.

In some implementations, some of the processing that occurs on the network server 210 may occur on the user device 204 and vice versa. For example, the user device 204 may include a model trainer 216 that accesses the training data 214. The models trained by a model trainer on the user device 204 may be stored in the local models 224 and/or the server models 218. The network server 210 may include a validation manager 144. The validation manager of the network server 210 may receive the video call data 238, the location data 242, and the watch sensor data 254. The validation manager of the network server 210 may generate a validation score and store the validation score on the network server 210. The network server 210 may be configured to generate a graphical interface based on the validation results and transmit the graphical interface to the user device 204 along with the video call data 238. In this case, the network server 210 may not transmit the validation score 248, the location data 242, and/or the watch sensor data 254 to the user device 204.

In some implementations, the system 100 of FIG. 1 and/or the system 200 of FIG. 2 may be configured to analyze text-based conversations. These text-based conversations may be real-time conversations where multiple users are talking in a chat application, conversations in a text messaging application, or any other similar conversations. The training data may include the text of the messaging conversation, sensor data, other additional types of data described above, and data related to the typing patterns of the user. The typing patterns may include the speed at which a user types, statistics related to the typing speed (e.g. average time between keystrokes, standard deviation of time between keystrokes, etc.), the time that a user takes to reply, abbreviations used, slang used, punctuation style, and any other similar typing patterns. The model trainers may train models that are configured to receive the data related to text-based conversations. The validation rules may also include rules related to the patterns in the text-based conversations. For example, a rule may indicate that if a standard deviation of the time between keystrokes is less than a threshold, then the likelihood of a deepfake should be increased.

Figure 3:
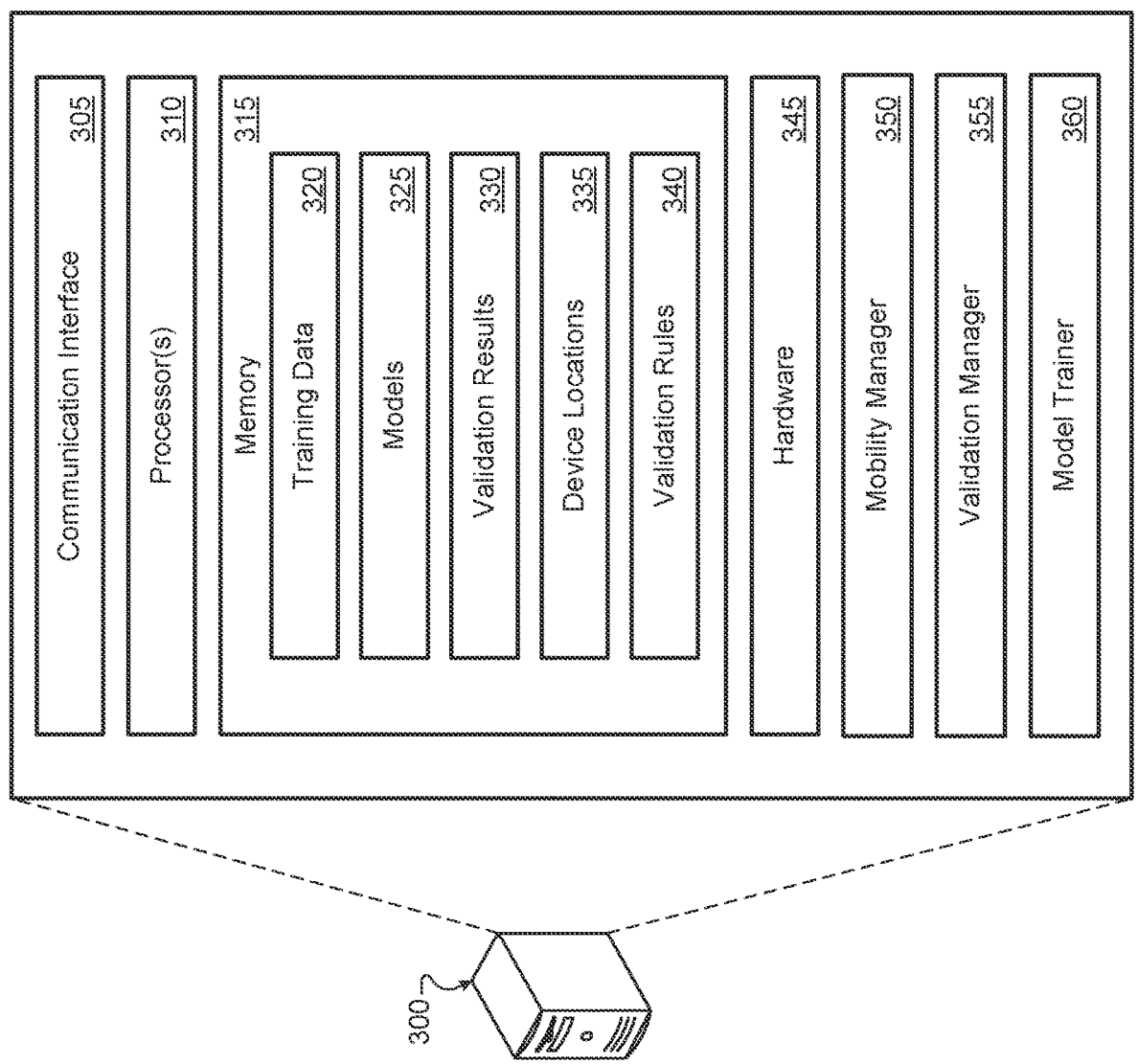
FIGS. 3 and 4 illustrate example servers for identifying deepfake media content.

FIG. 3 illustrates an example server 300 for identifying deepfake media content. The server 300 may be any type of computing device that is configured to manage a wireless network. For example, the server 300 may be similar to the network server 110 of FIG. 1 and/or the network server 210 of FIG. 2. In some implementations, the server 300 may be a virtual computing device in the form of virtual machines or software containers that are hosted in a cloud. The components of server 300 may be implemented in a single computing device or distributed over multiple computing devices.

The server 300 may include a communication interface 305, one or more processors 310, memory 315, and hardware 345. The communication interface 305 may include wireless and/or wired communication components that enable the server 300 to transmit data to and receive data from other networked devices. The hardware 345 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a mobility manager 350. The mobility manager 350 may be similar to the mobility manager 146 of FIG. 1 and/or the mobility manager 256 of FIG. 2. The mobility manager 350 may be configured to monitor the location of a computing device that is connected to the server 300 through a wireless base station such as a gNodeB. The location of the computing device may include the wireless base station to which the subscriber device is connected, an IP address of the network to which the subscriber device is connected, GPS data received from the subscriber device, beamforming data used to communicate with the computing device, and/or signal strength data of signals used to communicate with the computing device. The mobility manager 350 may store the location data in the device locations 335 that is implemented by the memory 315.

The mobility manager 350 may determine the base station that each computing device is connected to and store data identifying the current base station in the device locations 335. In some instances, the entry in the device locations 335 for each computing device on the wireless carrier network may not include one or more of the current base station, IP address, GPS data, beamforming data, and/or signal strength data. For example, a computing device may not be currently utilizing its GPS receiver, or the user may have opted out of sharing the GPS data. In this case, the device locations 335 may not include GPS data for that computing device. In some implementations, the computing device may not be connected to a Wi-Fi network. In this case, the IP address may indicate an IP address provided by the wireless carrier network.

The one or more processors 310 may implement a model trainer 360. The model trainer 360 may be similar to the model trainer 114 of FIG. 1 and/or the model trainer 216 of FIG. 2. The model trainer 360 is configured to use machine learning to generate a model to determine whether communication data includes deepfake media content. The model trainer 360 accesses the training data 320 that includes communication data samples that are each labeled as either including deepfake media content or not including deepfake media content. For example, the training data 320 may include a genuine voicemail recorded by an individual and a label that the genuine voicemail does not include any deepfake media content. The training data 320 may also include a deepfake voicemail generated by a computer and a label that the deepfake voicemail includes deepfake media content. The training data 320 may also include video call data and a corresponding label indicating whether the video call data includes deepfake media content.

The model trainer 360 generates a model that is configured to receive a particular type of communication data and output data indicating whether the communication data likely includes deepfake media content. The model trainer 360 stores the model in the models 325. The model trainer 360 may be configured to generate a model for each different type of communication data. For example, the model trainer 360 may generate a model using the voicemail data. That model may be configured to receive voicemails and output data indicating whether the voicemail includes deepfake media content. As another example, the model trainer 360 may generate a model using video call data. That model may be configured to receive video call data and output data indicating whether the video call includes deepfake media content.

In some implementations, the model trainer 360 may identify the training data for a particular model based on the type of media included each sample. For example, the model trainer 360 may group the training data 320 that only include voice data and generate a model using the voice data. The resulting model would be configured to analyze voicemail files or continuously receive voice data during a real-time phone call. The resulting model would be configured to output a validation score indicating the likelihood that the input included deepfake media content. For a voicemail, the model may output only one validation score. For a real-time phone call, the model continuously receives voice data and adjusts the validation score as the model received additional voice data. In a typical situation, the validation score may move towards zero or one as the model receives more data and is more confident that the voice data includes or does not include deepfake media content.

The one or more processors 310 may implement a validation manager 355. The validation manager 355 may be similar to the validation manager 144 of FIG. 1 and/or the validation manager 240 of FIG. 2. The validation manager 355 is configured to analyze communication data received from a computing device. The validation manager 355 may use the models 325 and/or the validation rules 340 to determine whether the communication data includes deepfake media content. The validation manager 355 stores data indicating whether the communication data includes deepfake media content in the validation results 330.

The validation manager 355 may receive the communication data and determine the type of media included in the communication data. If the communication data includes only voice, then the validation manager 355 may select a model that is trained on only voice data. If the communication data includes only video, then the validation manager 355 may select a model that is trained on only video data. If the communication includes video and audio, the validation manager 355 may select a model that is trained on video and audio data. In some implementations, the model may be configured to continuously receive communication data as the server 300 receives the communication data in real-time. In some implementations, the model may be configured to receive and analyze the communication data after the server 300 has stored the communication data of the memory 315.

The validation manager 355 provides the communication data as an input to the selected model. The model outputs data indicating whether the communication data includes deepfake media content. In some implementations, the model may output a validation score that indicates a likelihood that the communication data includes deepfake media content.

The validation manager 355 may apply the validation rules 340 to adjust the validation score. The validation rules 340 may include a series of tests to determine the likelihood that the communication data includes deepfake media content. A rule may be based on data that was collected from the user or computing device of the user during the transmission, generation, or receipt of the communication data. The data that was collected from the user or computing device of the user may include image data, GPS data, proximity sensor data, ambient light sensor data, accelerometer data, gyroscope data, barometric data, compass data, moisture sensor data, and/or any other similar type of data. The data may include biometric data such as blood pressure data, pulse data, temperature data, fingerprint data, iris data, retina data, and/or any other similar type of biometric data.

The validation manager 355 may identify the validation rules 340 to apply based on the sensor data received in addition to the communication data. For example, the validation manger 355 may receive image data along with a voicemail. The validation manager 355 may determine that the image data includes an image of the speaker's face. The validation manager 355 may be able to approximate a size of the speaker's irises based on the image data. The validation rules 340 may indicate that if a speaker's irises are within a range or a size relative to the pupils, then the validation manager 355 should adjust the validation score to indicate the voicemail is more likely to include deepfake media content. If the speaker's irises are outside of that range or outside of the size relative to the pupils, then the validation manager 355 should adjust the validation score to indicate the voicemail is less likely to include deepfake media content.

As another example, the validation manager 355 may receive video data along with audio data of a telephone conversation. The validation manager 355 may be able to determine the diaphragm movement of the speaker based on the video data. The validation rules 340 may indicate that if a speaker's diaphragm movement is within a threshold of the expected diaphragm movement based on the audio data, then the validation manager 355 should adjust the validation score to indicate the audio data is less likely to include deepfake media content. If the speaker's diaphragm movement is outside of the threshold of the expected diaphragm movement based on the audio data, then the validation manager 355 should adjust the validation score to indicate the audio data is more likely to include deepfake media content.

The validation manager 355 is configured to output a validation graphic indicating the validation score. The user may decide to take an action based on the validation graphic. For example, the user may attempt to communicate with the other user through another communication channel to verify whether the communication was authentic. In some implementations, the user may request that the user provide additional data to prove the identity of the other user. For example, in the case of a telephone conversation, the validation graphic may indicate that the audio data likely includes deepfake media content. The user may request that the other user provide video data of the other user speaking. If the other user does not comply, then the user may terminate the conversation.

In some implementations, the validation manager 355 may automatically take action based on the validation score. If the validation score is less than a threshold, which indicates that the communication data likely includes deepfake media content, then the validation manager 355 may terminate the communication in the event of a real-time conversation. If the validation score is less than the threshold, then the validation manager 355 may automatically request that the questionable user provide additional data from another sensor such as a sensor from a wearable device. If the questionable user does not comply, then the validation manager 355 may adjust the validation score to indicate that the communication data likely is even more likely to include deepfake media content.

Figure 4:
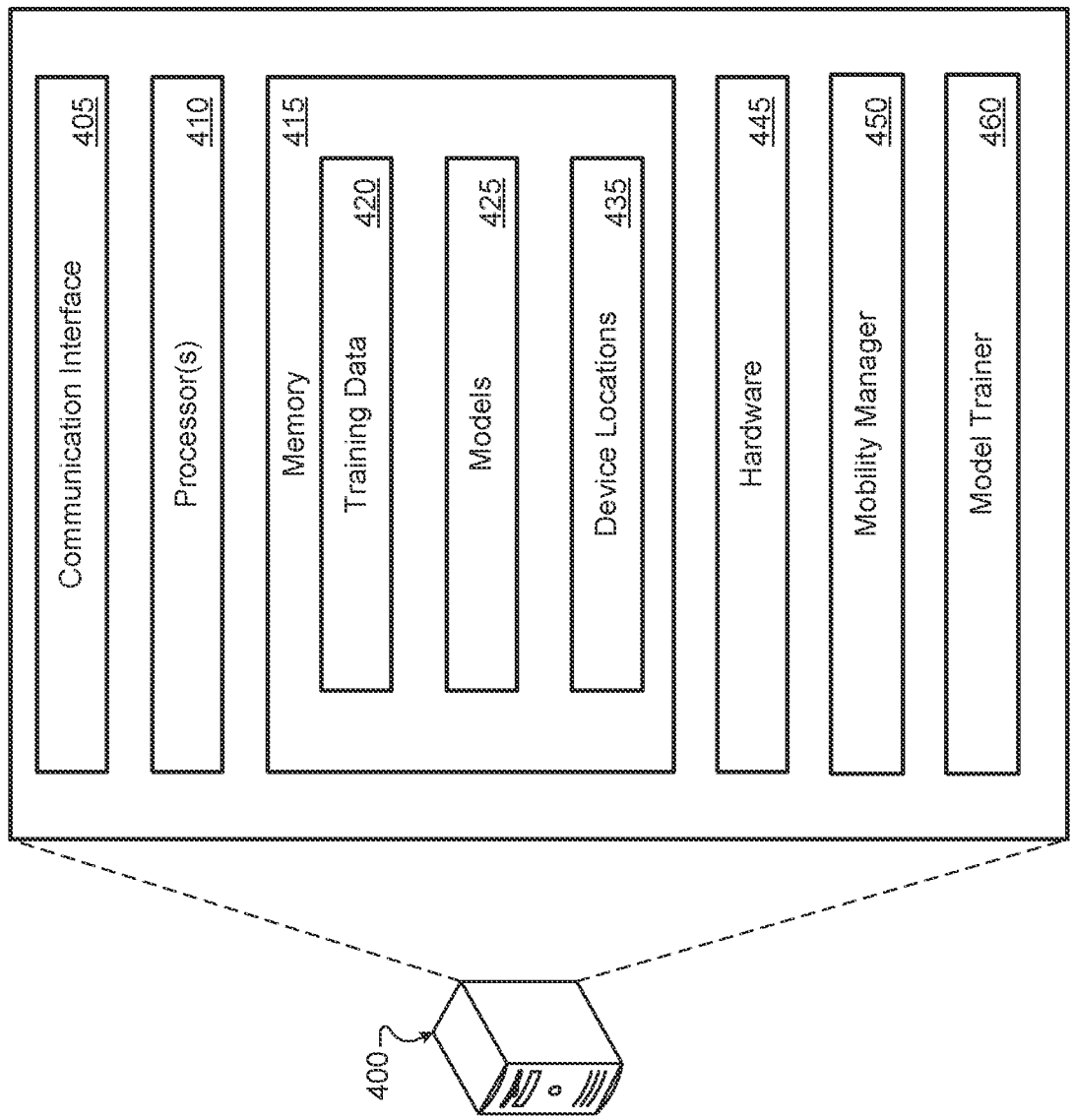

FIG. 4 illustrates an example server 400 for identifying deepfake media content. The server 400 may be any type of computing device that is configured to manage a wireless network. For example, the server 400 may be similar to the network server 110 of FIG. 1 and/or the network server 210 of FIG. 2. In some implementations, the server 400 may be a virtual computing device in the form of virtual machines or software containers that are hosted in a cloud. The components of server 400 may be implemented in a single computing device or distributed over multiple computing devices.

The server 400 may include a communication interface 405, one or more processors 410, memory 415, and hardware 445. The communication interface 405 may include wireless and/or wired communication components that enable the server 400 to transmit data to and receive data from other networked devices. The hardware 445 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 415 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 410 may implement a mobility manager 450. The mobility manager 450 may be similar to the mobility manager 146 of FIG. 1 and/or the mobility manager 256 of FIG. 2. The mobility manager 450 may be configured to monitor the location of a computing device that is connected to the server 400 through a wireless base station such as a gNodeB. The location of the computing device may include the wireless base station to which the subscriber device is connected, an IP address of the network to which the subscriber device is connected, GPS data received from the subscriber device, beamforming data used to communicate with the computing device, and/or signal strength data of signals used to communicate with the computing device. The mobility manager 450 may store the location data in the device locations 435 that is implemented by the memory 415.

The mobility manager 450 may determine the base station that each computing device is connected to and store data identifying the current base station in the device locations 435. In some instances, the entry in the device locations 435 for each computing device on the wireless carrier network may not include one or more of the current base station, IP address, GPS data, beamforming data, and/or signal strength data. For example, a computing device may not be currently utilizing its GPS receiver, or the user may have opted out of sharing the GPS data. In this case, the device locations 435 may not include GPS data for that computing device. In some implementations, the computing device may not be connected to a Wi-Fi network. In this case, the IP address may indicate an IP address provided by the wireless carrier network.

The one or more processors 410 may implement a model trainer 460. The model trainer 460 may be similar to the model trainer 114 of FIG. 1 and/or the model trainer 216 of FIG. 2. The model trainer 460 is configured to use machine learning to generate a model to determine whether communication data includes deepfake media content. The model trainer 460 accesses the training data 420 that includes communication data samples that are each labeled as either including deepfake media content or not including deepfake media content. For example, the training data 420 may include a genuine voicemail recorded by an individual and a label that the genuine voicemail does not include any deepfake media content. The training data 420 may also include a deepfake voicemail generated by a computer and a label that the deepfake voicemail includes deepfake media content. The training data 420 may also include video call data and a corresponding label indicating whether the video call data includes deepfake media content.

The model trainer 460 generates a model that is configured to receive a particular type of communication data and output data indicating whether the communication data likely includes deepfake media content. The model trainer 460 stores the model in the models 425. The model trainer 460 may be configured to generate a model for each different type of communication data. For example, the model trainer 460 may generate a model using the voicemail data. That model may be configured to receive voicemails and output data indicating whether the voicemail includes deepfake media content. As another example, the model trainer 460 may generate a model using video call data. That model may be configured to receive video call data and output data indicating whether the video call includes deepfake media content.

In some implementations, the model trainer 460 may identify the training data for a particular model based on the type of media included each sample. For example, the model trainer 460 may group the training data 420 that only include voice data and generate a model using the voice data. The resulting model would be configured to analyze voicemail files or continuously receive voice data during a real-time phone call. The resulting model would be configured to output a validation score indicating the likelihood that the input included deepfake media content. For a voicemail, the model may output only one validation score. For a real-time phone call, the model continuously receives voice data and adjusts the validation score as the model received additional voice data. In a typical situation, the validation score may move towards zero or one as the model receives more data and is more confident that the voice data includes or does not include deepfake media content.

Figure 5:
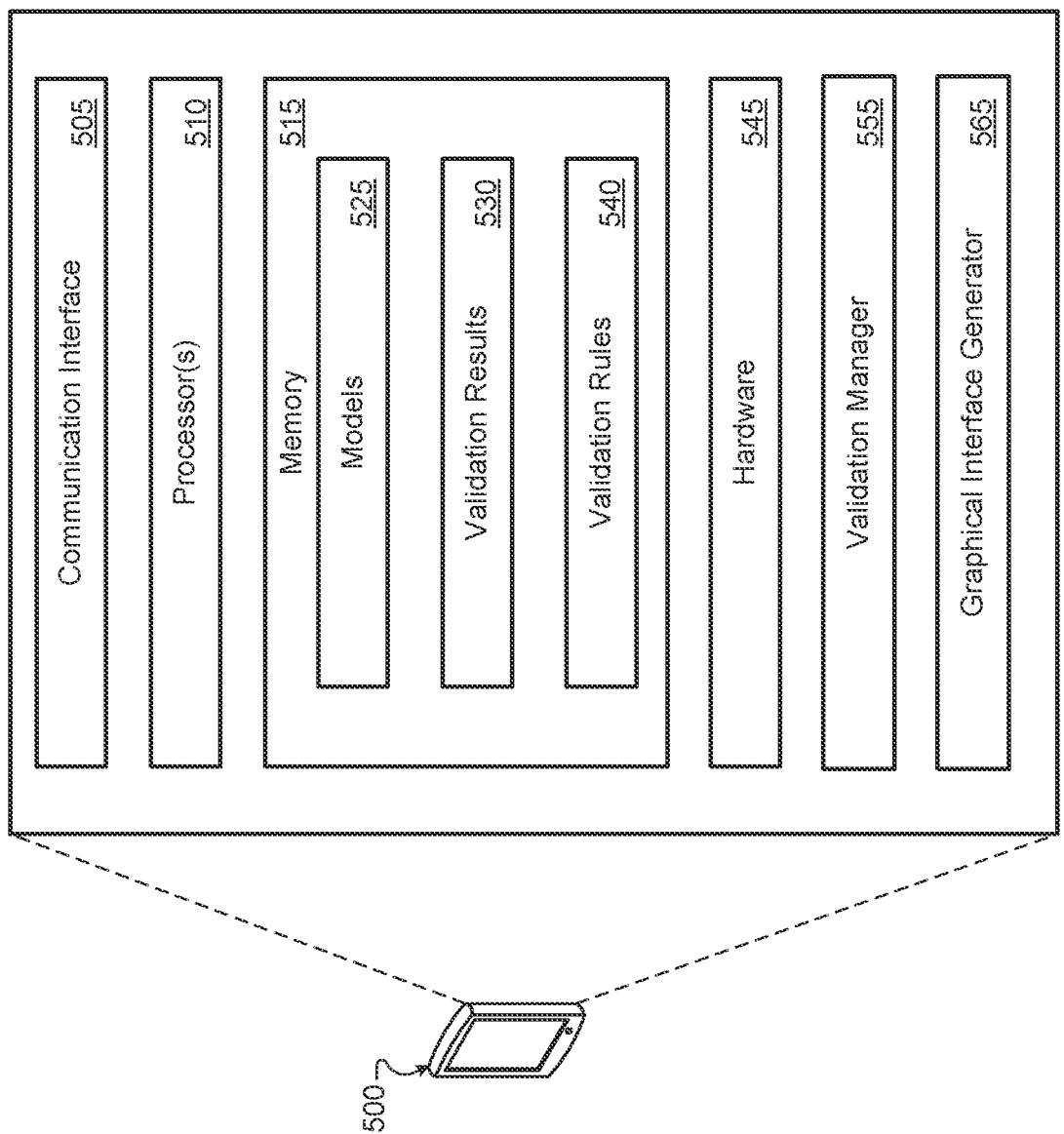
FIG. 5 illustrates an example client device for identifying deepfake media content

FIG. 5 illustrates an example client device 500 for identifying deepfake media content. The client device 500 may be any type of computing device that is configured to connect or otherwise interact with a wireless network. For example, the client device 500 may be similar to the client device 104 of FIG. 1 and/or the client device 204 of FIG. 2. In some implementations, the client device 500 may be a mobile phone, a laptop, a tablet, a desktop computer, a wearable device, or any other similar type of computing device. Portions of the client device 500 may be virtual devices in the form of virtual machines or software containers that are hosted in a cloud. The components of the client device 500 may be implemented in a single computing device or distributed over multiple computing devices.

The client device 500 may include a communication interface 505, one or more processors 510, memory 515, and hardware 545. The communication interface 505 may include wireless and/or wired communication components that enable the client device 500 to transmit data to and receive data from other networked devices. The hardware 545 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 515 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 510 may implement a validation manager 555. The validation manager 555 may be similar to the validation manager 144 of FIG. 1 and/or the validation manager 240 of FIG. 2. The validation manager 555 is configured to analyze communication data received from a computing device. The validation manager 555 may use the models 525 and/or the validation rules 540 to determine whether the communication data includes deepfake media content. The validation manager 555 stores data indicating whether the communication data includes deepfake media content in the validation results 530.

The validation manager 555 may receive the communication data and determine the type of media included in the communication data. If the communication data includes only voice, then the validation manager 555 may select a model that is trained on only voice data. If the communication data includes only video, then the validation manager 555 may select a model that is trained on only video data. If the communication includes video and audio, then the validation manager 555 may select a model that is trained on video and audio data. In some implementations, the model may be configured to continuously receive communication data as the client device 500 receives the communication data in real-time. In some implementations, the model may be configured to receive and analyze the communication data after the client device 500 has stored the communication data of the memory 515.

The validation manager 555 provides the communication data as an input to the selected model. The model outputs data indicating whether the communication data includes deepfake media content. In some implementations, the model may output a validation score that indicates a likelihood that the communication data includes deepfake media content.

The validation manager 555 may apply the validation rules 540 to adjust the validation score. The validation rules 540 may include a series of tests to determine the likelihood that the communication data includes deepfake media content. A rule may be based on data that was collected from the user or computing device of the user during the transmission, generation, or receipt of the communication data. The data that was collected from the user or computing device of the user may include image data, GPS data, proximity sensor data, ambient light sensor data, accelerometer data, gyroscope data, barometric data, compass data, moisture sensor data, and/or any other similar type of data. The data may include biometric data such as blood pressure data, pulse data, temperature data, fingerprint data, iris data, retina data, and/or any other similar type of biometric data.

The validation manager 555 may identify the validation rules 540 to apply based on the sensor data received in addition to the communication data. For example, the validation manger 555 may receive image data along with a voicemail. The validation manager 555 may determine that the image data includes an image of the speaker's face. The validation manager 555 may be able to approximate a size of the speaker's irises based on the image data. The validation rules 540 may indicate that if a speaker's irises are within a range or a size relative to the pupils, then the validation manager 555 should adjust the validation score to indicate the voicemail is more likely to include deepfake media content. If the speaker's irises are outside of that range or outside of the size relative to the pupils, then the validation manager 555 should adjust the validation score to indicate the voicemail is less likely to include deepfake media content.

As another example, the validation manager 555 may receive video data along with audio data of a telephone conversation. The validation manager 555 may be able to determine the diaphragm movement of the speaker based on the video data. The validation rules 540 may indicate that if a speaker's diaphragm movement is within a threshold of the expected diaphragm movement based on the audio data, then the validation manager 555 should adjust the validation score to indicate the audio data is less likely to include deepfake media content. If the speaker's diaphragm movement is outside of the threshold of the expected diaphragm movement based on the audio data, then the validation manager 555 should adjust the validation score to indicate the audio data is more likely to include deepfake media content.

The one or more processors 510 may implement a graphical interface generator 565. The graphical interface generator 565 is configured to output a validation graphic indicating the validation score. The user may decide to take an action based on the validation graphic. For example, the user may attempt to communicate with the other user through another communication channel to verify whether the communication was authentic. In some implementations, the user may request that the user provide additional data to prove the identity of the other user. For example, in the case of a telephone conversation, the validation graphic may indicate that the audio data likely includes deepfake media content. The user may request that the other user provide video data of the other user speaking. If the other user does not comply, then the user may terminate the conversation.

In some implementations, the validation manager 555 may automatically take action based on the validation score. If the validation score is less than a threshold, which indicates that the communication data likely includes deepfake media content, then the validation manager 555 may terminate the communication in the event of a real-time conversation. If the validation score is less than the threshold, then the validation manager 555 may automatically request that the questionable user provide additional data from another sensor such as a sensor from a wearable device. If the questionable user does not comply, then the validation manager 555 may adjust the validation score to indicate that the communication data likely is even more likely to include deepfake media content.

Figure 6:
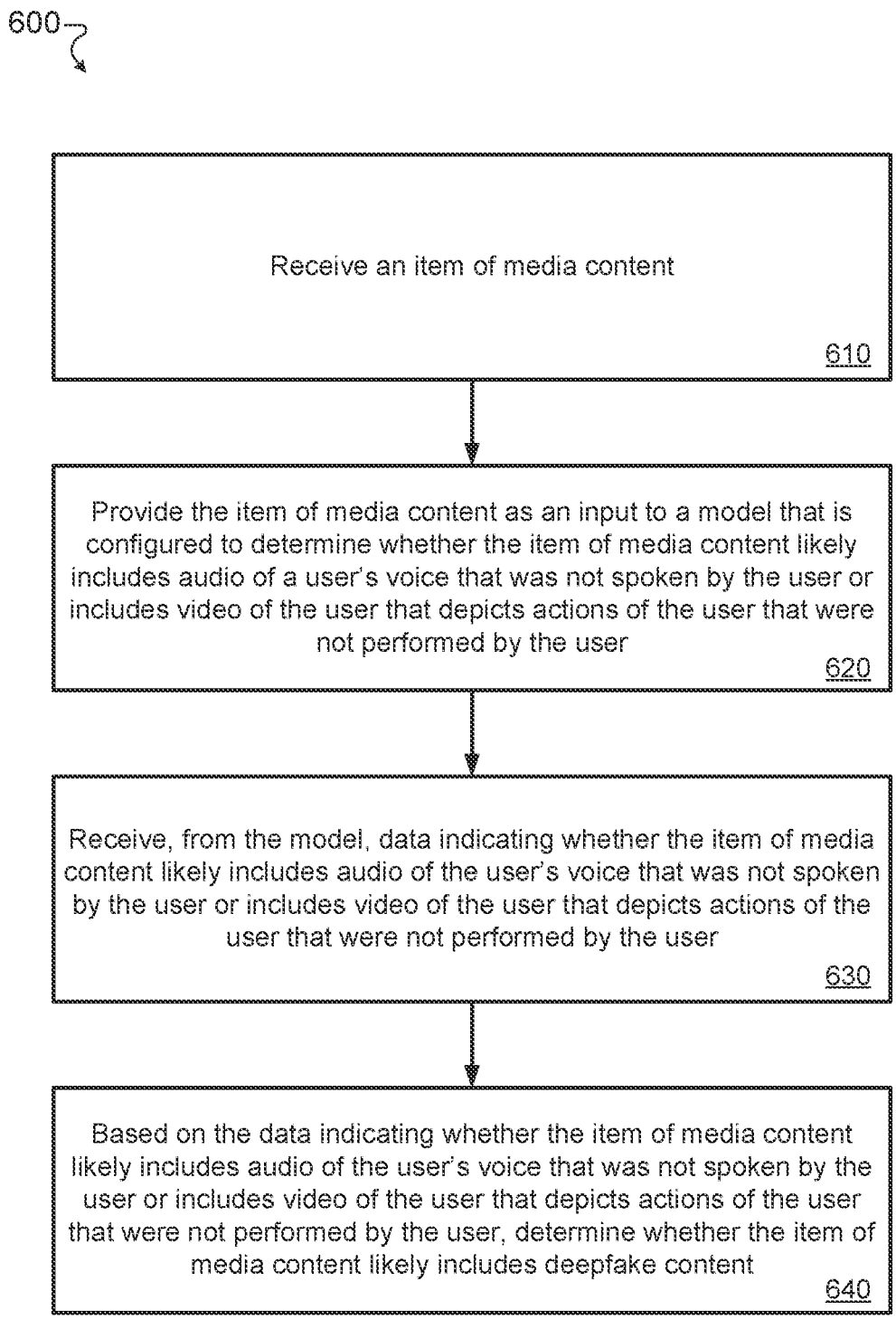
FIGS. 6, 7, 8, and 9 are flowcharts of example processes for identifying deepfake media content.

FIG. 6 is a flowchart of an example process 600 for identifying deepfake media content. In general, the process 600 receives an item of media content and provides that item of media content to a model that is trained to determine whether the item of media content likely includes deepfake media content. The process 600 receives, from the model, data indicating whether the item of media content likely includes deepfake media content and provides an indication to the user. The process 600 will be described as being performed by the network server 110 of FIG. 1 and will include references to other components in FIG. 1. The process 300 may also be performed by the network server 210 of FIG. 2 or the server 300 of FIG. 3.

The network server 110 receives an item of media content (610). The network server 110 may receive the item of media content from the user device 108. The item of media content may be a voicemail that a user generated using a text-to-speech system. In some implementations, the network server 110 also receives biometric data that reflects an attribute of the user. The user may be wearing a wearable device that is capable of detecting and transmitting biometric data. The user device 108 may also collect and transmit the biometric data. In some implementations, the network server 110 receives sensor data that reflects an attribute of the user device 108. The user device 108 may include a camera, microphone, GPS receiver, and other sensors. Each sensor may generate sensor data and transmit the sensor data to the network server 110. In some implementations, the user 108 may authorize or limit whether the user device 108 and/or the wearable device collect and/or transmit the biometric data and sensor data to the network server 110.

The network server 110 provides the item of media content as an input to a model that is configured to determine whether the item of media content likely includes audio of a user's voice that was not spoken by the user or includes video of the user that depicts actions of the user that were not performed by the user (620). Before providing the item of media content to the model, the network server 110 trains the model using machine learning and training data. The training data includes samples of items of media content that are each labeled as including audio of a user's voice that was not spoken by the user, including video of the user that depicts actions of the user that were not performed by the user, including both audio of a user's voice that was not spoken by the user and video of the user that depicts actions of the user that were not performed by the user, or including neither audio of a user's voice that was not spoken by the user nor video of the user that depicts actions of the user that were not performed by the user. The model is configured to receive an item of media content and output data indicating whether the item of media content like includes audio of a user's voice that was not spoken by the user or video of the user that depicts actions of the user that were not performed by the user.

In some implementations, the network server 110 may train multiple models, where each model is configured to receive a different type of media content. For example, the network server 110 may use audio samples to train a model that is configured to receive audio content. The network server 110 may use video samples to train a model that is configured to receive video content. The network server 110 may use audio and video samples to train a model that is configured to receive audio and video content. The network server 110 may select the appropriate model based on the item of media content.

The network server 110 receives, from the model, data indicating whether the item of media content likely includes audio of the user's voice that was not spoken by the user or includes video of the user that depicts actions of the user that were not performed by the user (630). The model may indicate that the item of media content likely includes audio of the user's voice that was not spoken by the user, likely includes video of the user that depicts actions of the user that were not performed by the user, likely includes both audio of the user's voice that was not spoken by the user and video of the user that depicts actions of the user that were not performed by the user, or likely includes neither audio of a user's voice that was not spoken by the user nor video of the user that depicts actions of the user that were not performed by the user.

In some implementations, the model may provide a validation score that indicates the likelihood that the item of media content likely includes audio of the user's voice that was not spoken by the user or includes video of the user that depicts actions of the user that were not performed by the user. The validation score may be on a scale from zero to one where zero indicates that the item of media content does not include audio of the user's voice that was not spoken by the user or includes video of the user that depicts actions of the user that were not performed by the user and one indicates that the item of media content does include audio of the user's voice that was not spoken by the user or includes video of the user that depicts actions of the user that were not performed by the user.

The network server 110 may use validation rules to adjust the validation score. In some implementations, the network server 110 may use the validation rules instead of the model to determine a validation score. The validation rules may include how to adjust the validation score based on the sensor data and the biometric data. The validation rules may specify patterns to identify in the sensor data and the biometric data that may indicates that an item of media content is more or less likely to include audio of the user's voice that was not spoken by the user or video of the user that depicts actions of the user that were not performed by the user. For example, a validation rule may specify to adjust the validation score by increasing the likelihood that the item of media content includes audio of the user's voice that was not spoken by the user or includes video of the user that depicts actions of the user that were not performed by the user if the blood pressure of the user exhibits patterns similar to that of a nervous person. Another validation rule may specify to adjust the validation score by decreasing the likelihood that the item of media content includes audio of the user's voice that was not spoken by the user or includes video of the user that depicts actions of the user that were not performed by the user's breathing movements match that of a calm person and/or match the spoken words.

In some implementations, the network server 110 may request that a user provide sensor data and/or biometric data. If the user does not comply, then the network server 110 may adjust the validation score by increasing the likelihood that the item of media content includes audio of the user's voice that was not spoken by the user or includes video of the user that depicts actions of the user that were not performed by the user.

In some implementations, the network server 110 may receive additional data of the item of media content. This may occur during real-time communications such as a video call, telephone call, or another similar type of real-time communication. The network server 110 may provide the additional data to the model. As the model receives more data of the item of media content, the model may adjust the validation score.

Based on the data indicating whether the item of media content likely includes audio of the user's voice that was not spoken by the user or includes video of the user that depicts actions of the user that were not performed by the user, the network server 110 determines whether the item of media content likely includes deepfake content. (640). The network server 110 generates and outputs a validation graphic to indicate to the other user participating in the communication whether the item of media content likely includes deepfake content. The other user may elect to take an action such as terminate the call, contact the user through another communication channel, or request that the user provide additional sensor data and/or biometric data. In some implementations, the network server 110 may perform similar actions if the network server 110 determines that the item of media content likely includes deepfake content.

In some implementations, the other user may provide the network server 110 with data indicating whether the item of media content includes deepfake content. The network server 110 may store the item of media content and a label indicating whether it includes deepfake content with the other training data. The network server 110 may retrain the model using the updated training data.

Figure 7:
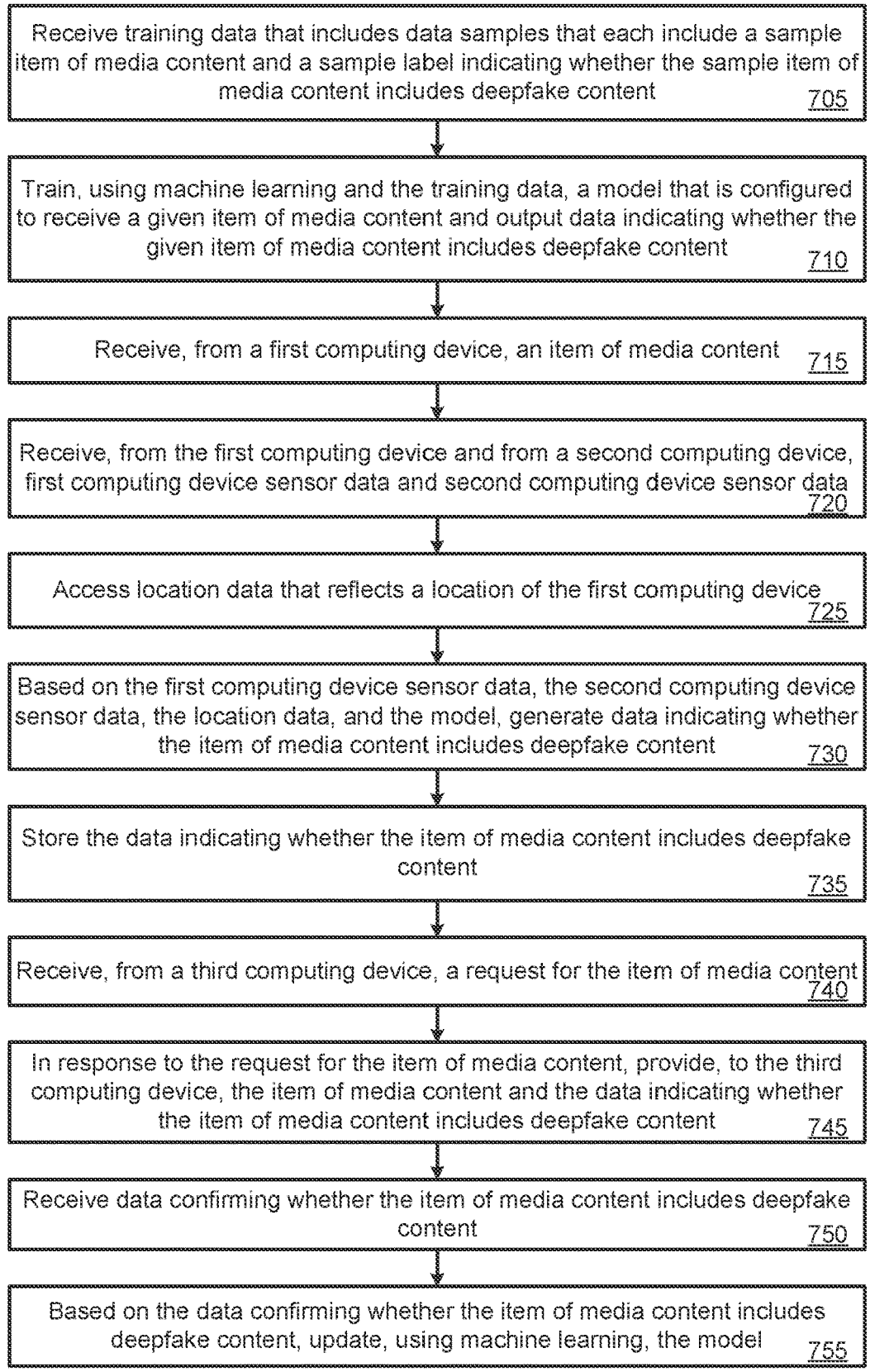

FIG. 7 is a flowchart of an example process 700 for identifying deepfake media content. In general, the process 700 trains a model to receive an item of media content and output data indicating whether the item of media content includes deepfake content. The process 700 receives an item of media content and other sensor data and uses the model to determine whether the item of media content includes deepfake content. The process 700 outputs data indicating whether the item of media content includes deepfake content. The process 700 may retrain the model after receiving data confirming whether the item of media content includes deepfake content. The process 700 will be described as being performed by the network server 110 of FIG. 1 and will include references to other components in FIG. 1. In some implementations, portions of the process 700 may be performed by the network server 210 of FIG. 2, the server 300 of FIG. 3, the server 400 of FIG. 4, and/or the client device 500 of FIG. 5.

The network server 110 receives training data that includes data samples that each include a sample item of media content and a sample label indicating whether the sample item of media content includes deepfake content (705). The training data may include data samples of a similar type. For example, the training data may include audio samples of a person speaking, video samples of a person performing an action, or audio and video samples of a person speaking and/or performing an action. In some implementations, a computing device may analyze each data sample and identify a sample label for each of the data samples. In some implementations, a computing device may receive data identifying a sample label for each of the data samples. In this case, the computing device may receive each sample label from a user. In some implementations, each data sample may be unlabeled.

In some implementations, each data samples may include additional data. The additional data may include location data, image and/or video data, biometric data, audio data. The location data may include data that indicates a location of the device that collected the audio sample, the video sample, or the audio/video sample. The location data may be based on GPS data, triangulation, and/or a location of a nearby device. The image and/or video data may be collected from the device that collected the audio sample, the video sample, or the audio/video sample. In some implementations, the image and/or video data may be in addition to the video data included in the data sample. In some implementations, a different camera may have collected the image and/or video data than the camera that collected the other video data included in the data sample. The biometric data may include blood pressure data, pulse data, temperature data, fingerprint data, retina data, iris data, and/or any other similar biometric data. The biometric data may be collected from the person near the device that collected the audio sample, the video sample, or the audio/video sample. The audio data may be collected from the device that collected the audio sample, the video sample, or the audio/video sample. In some implementations, the audio data may be in addition to the audio data included in the data sample. In some implementations, a different microphone may have collected the audio data than the microphone that collected the other audio data included in the data sample. The location data, image and/or video data, biometric data, audio data may be collected from the same or a different device that collected the audio sample, the video sample, or the audio/video sample.

The network server 110 trains, using machine learning and the training data, a model that is configured to receive a given item of media content and output data indicating whether the given item of media content includes deepfake content (710). The network server 110 may use various types of machine learning techniques. Those techniques may include supervised learning, unsupervised learning, semi-supervised learning, reinforcement learning, deep learning, self learning, feature learning, sparse dictionary learning, anomaly detection, robot learning, and/or association rules. The model may use artificial neural networks, decision trees, support vector machines, regression analysis, Bayesian networks, and/or genetic algorithms.

The data that the model is configured to receive is based on the training data. If the training data includes audio samples, then the model is trained to receive audio samples. If the training data includes blood pressure data and video data, then the model is trained to receive blood pressure data and video data. In some implementations, the network server 110 may train the model using the audio samples, the video samples, or the audio/video samples without using the additional data.

The network server 110 receives, from a first computing device, an item of media content (715). The first computing device may be similar to the client device 108. The first computing device may generate the item of media content in response to instructions from a user. For example, the first computing device may generate a synthesized speech file of text received from a user. As another example, the first computing device may receive audio from a user speaking into a microphone of the first computing device. In some implementations, the first computing device may modify the audio so that the audio sounds as if another person is speaking. The item of media content may be a file that the first computing device generates and transmits to the network server 110.

The network server 110 receives, from the first computing device and from a second computing device, first computing device sensor data and second computing device sensor data (720). In addition to the sensors that detect the audio or video of the user, the first computing device may include additional sensors. The additional sensors may include an additional camera, an additional microphone, a GPS receiver, an accelerometer, a gravity sensor, an ambient light sensor, a magnetometer, a proximity sensor, and/or a gyroscope. One or more of these additional sensors may provide sensor data to the network server 110. The additional sensors may collect the data before, during, and/or after the first computing device collects, generates, and/or transmits the item of media content.

The network server 110 may also receive sensor data from a second computing device. This second computing device may be any other computing device that is configured to collect data before, during, and/or after the first computing device collects, generates, and/or transmits the item of media content. The second computing device may be similar to the watch 120. The second computing device may collect the sensor data before, during, and/or after the first computing device collects, generates, and/or transmits the item of media content. The second computing device may include a blood pressure sensor, a pulse monitor, a thermometer, an optical heart sensor, an electrical heart sensor, an additional camera, an additional microphone, a GPS receiver, an accelerometer, a gravity sensor, an ambient light sensor, a magnetometer, a proximity sensor, and/or a gyroscope. In some implementations, the second computing device may collect and/or transmit the sensor data to the network server 110 in response to an instruction from the user. In some implementations, the second computing device may receive a request from the first computing device to collect and/or transmit the sensor data. In this case, the second computing device may request permission from the user before collecting and/or transmitting the sensor data.

The network server 110 accesses location data that reflects a location of the first computing device (725). The network server 110 may include a mobility manager that monitors the location of the first computing device. The location data may include a base station that the first computing device is connected to, a GPS location of the first computing device, and/or a triangulated location of the first computing device. The location data may also include historical location data that indicates the past locations where the first computing device was located.

Based on the first computing device sensor data, the second computing device sensor data, the location data, and the model, the network server 110 generates data indicating whether the item of media content includes deepfake content (730). The network server 110 may select the model from multiple different models based on the type of the item of media content and whether the network server 110 received any sensor data or any location data. In some implementations, the network server 110 may receive the item of media content without any sensor data or location data. In this case, the network server 110 may select a model that is configured to receive the item of media content. In some implementations, the network server 110 may receive the item of media content with blood pressure data and no location data. In this case, the network server 110 may select a model that is configured to receive the item of media content and the blood pressure data. In some implementations, the network server 110 may receive the item of media content with pulse data, blood pressure data, and location data. The network server 110 may not have access to a model that is configured to receive pulse data, location data, and blood pressure data. In this case, the network server 110 may select a model that is configured to receive the item of media content and blood pressure data.

In some implementations, the output of the model may be binary and indicate whether the item of media content includes deepfake content. In some implementations, the output of the model may be a validation score that indicates a likelihood of the item of media content including deepfake content. For example, the validation score may be 0.3 indicating a thirty percent chance that the item of media content includes deepfake content.

In some implementations, the network server 110 may access one or more validation rules to further refine the validation score or adjust the binary output. In some implementations, the network server 110 may use the validation rules instead of the model to generate the data indicating whether the item of media content includes deepfake content. The validation rules may indicate how the network server 110 should adjust the validation score or the binary output based on the sensor data and/or the location data. For example, a validation rule may specify patterns to identify in the pulse data that may indicate that it is more likely that the item of media content includes deepfake content. If the network server 110 identifies those patterns, then the network server 110 may increase the validation score.

In some implementations, the network server 110 may identify and apply validation rules that are related to sensor data and/or location data that was not provided as an input to the model. This may occur because the network server 110 did not have access to a model that was configured to receive the sensor data and/or the location data. For example, the model may receive the item of media content, which may be a voicemail. The network server 110 may also receive camera data and location data. In this case, the network server 110 may identify and apply one or more validation rules that relate to the location data and/or the camera data and adjust the validation score based on the result from the rules. In some implementations, the network server 110 may not have access to a rule and/or a model that is configured to receive the data that the network server 110 received. In this case, the network server 110 may that data.

The network server 110 stores the data indicating whether the item of media content includes deepfake content (735). The network server 110 may store the data indicating whether the item of media content includes deepfake content in association with the item of media content. If the item of media content is a file, then the network server 110 may store the data indicating whether the item of media content includes deepfake content with the file.

The network server 110 receives, from a third computing device, a request for the item of media content (740). The third computing device may be similar to the client device 104 from FIG. 1. The request for the item of media content may be in response to a request from a user. For example, the user may select a voicemail message from the user interface of the third computing device. The third computing device may request the corresponding voicemail that is stored on the network server 110.

In response to the request for the item of media content, the network server 110 provides, to the third computing device, the item of media content and the data indicating whether the item of media content includes deepfake content (745). The data indicating whether the item of media content may be the data output by the model. For example, the item of media content may be a voicemail and the data may be the validation score.

The third computing device may generate a user interface that includes the data indicating whether the item of media content includes deepfake content. For example, the user interface may indicate that there is a thirty percent chance that the item of media content includes deepfake content. The third computing device may generate and output the user interface before providing the item of media. In this case, the user may be able to decide whether to view or listen to the item of media content based on the data presented in the user interface. If the user interface indicates that there is a thirty percent chance, then the user may decide to listen or view the item of media content. If the user is not comfortable listening or viewing the item of media content, then the user may reach out to the sender of the item of media content through another channel. For example, the user may email the sender if the item of media content appears to be from the sender.

The network server 110 receives data confirming whether the item of media content includes deepfake content (750). The user may listen, view, or otherwise consume the item of media content and provide information on whether the item of media content includes deepfake content. To make this determination, the user may take various actions. The user may be able to determine by viewing or listening to the item of media content whether it includes deepfake content. The user may reach out to the sender through another communication channel to determine whether the item of media content includes deepfake content. The user may provide the data confirming whether the item of media content includes deepfake content to the third computing device. The third computing device may provide the data confirming whether the item of media content includes deepfake content to the network server 110. In some implementations, the user interface may request that the user provide the data confirming whether the item of media content includes deepfake content.

Based on the data confirming whether the item of media content includes deepfake content, the network server 110 updates, using machine learning, the model (755). The network server 110 may add the item of media content to the training data. The network server 110 may include the data confirming whether the item of media content includes deepfake content as a label to the training data. In the case where the network server 110 receives sensor data from the first computing device and/or the second computing device, the network server 110 may include that sensor data in the training data. With the addition of the item of media content, the data confirming whether the item of media content includes deepfake content, and/or the sensor data, the network server 110 may retrain the model using machine learning. The network server 110 may use the updated model to determine whether any subsequent items of media content include deepfake content.

Figure 8:
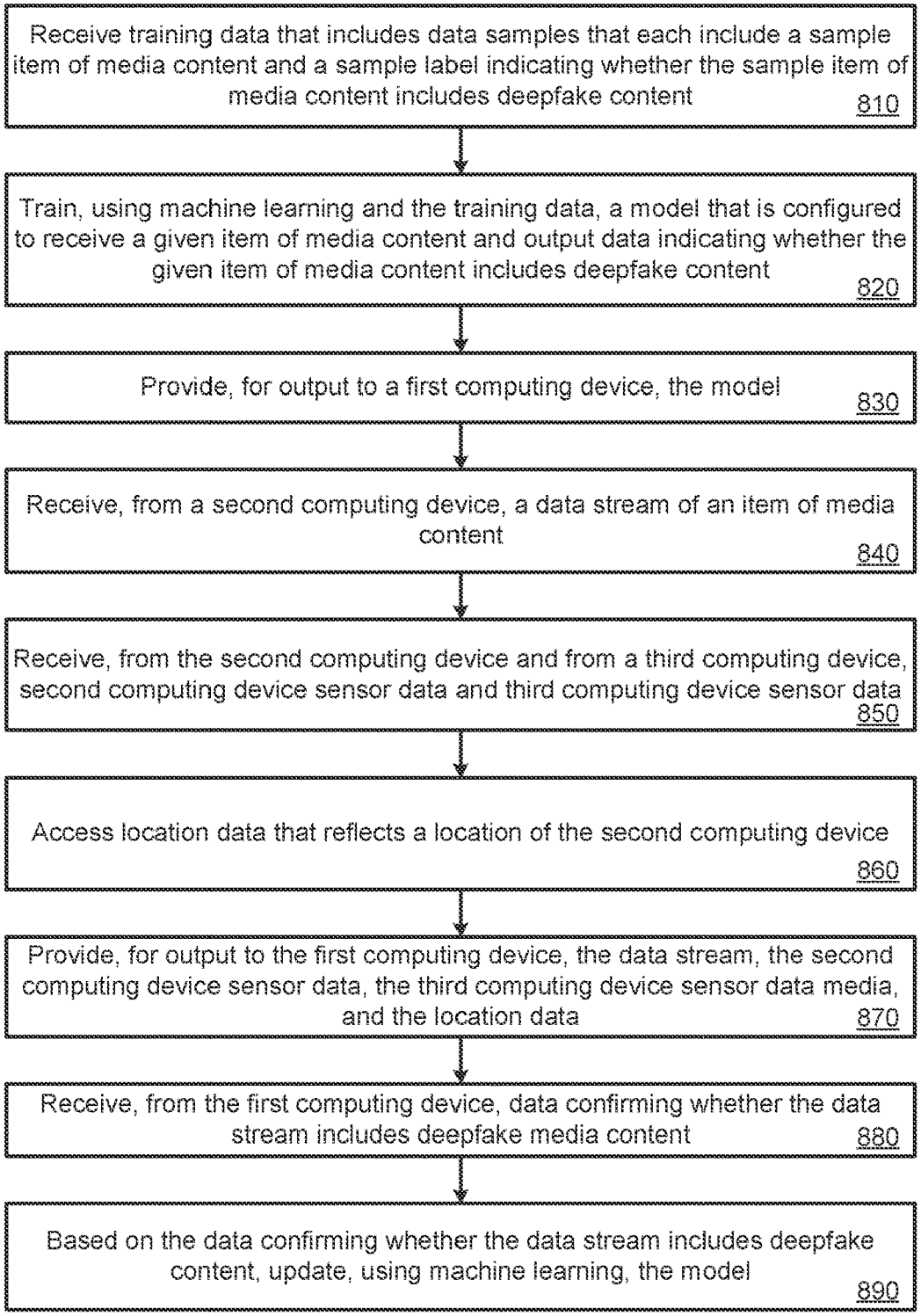

FIG. 8 is a flowchart of an example process 800 for identifying deepfake media content. In general, the process 800 trains a model to receive an item of media content and output data indicating whether the item of media content includes deepfake content. The process 800 outputs the model to another computing device. The process 800 receives an item of media content and other sensor data and provides the item of media content and the other sensor data to the other computing device. The process 800 receives data confirming whether the item of media content includes deepfake content. The process 800 updates the model using the data confirming whether the item of media content includes deepfake content. The process 800 will be described as being performed by the network server 210 of FIG. 2 and will include references to other components in FIG. 2. In some implementations, portions of the process 800 may be performed by the network server 110 of FIG. 1, the server 300 of FIG. 3, the server 400 of FIG. 4, and/or the client device 500 of FIG. 5.

The network server 210 receives training data that includes data samples that each include a sample item of media content and a sample label indicating whether the sample item of media content includes deepfake content (810). The training data may include data samples of a similar type. For example, the training data may include audio samples of a person speaking, video samples of a person performing an action, or audio and video samples of a person speaking and/or performing an action. In some implementations, a computing device may analyze each data sample and identify a sample label for each of the data samples. In some implementations, a computing device may receive data identifying a sample label for each of the data samples. In this case, the computing device may receive each sample label from a user. In some implementations, each data sample may be unlabeled.

In some implementations, each data sample may include additional data. The additional data may include location data, image and/or video data, biometric data, audio data. The location data may include data that indicates a location of the device that collected the audio sample, the video sample, or the audio/video sample. The location data may be based on GPS data, triangulation, and/or a location of a nearby device. The image and/or video data may be collected from the device that collected the audio sample, the video sample, or the audio/video sample. In some implementations, the image and/or video data may be in addition to the video data included in the data sample. In some implementations, a different camera may have collected the image and/or video data than the camera that collected the other video data included in the data sample. The biometric data may include blood pressure data, pulse data, temperature data, fingerprint data, retina data, iris data, and/or any other similar biometric data. The biometric data may be collected from the person near the device that collected the audio sample, the video sample, or the audio/video sample. The audio data may be collected from the device that collected the audio sample, the video sample, or the audio/video sample. In some implementations, the audio data may be in addition to the audio data included in the data sample. In some implementations, a different microphone may have collected the audio data than the microphone that collected the other audio data included in the data sample. The location data, image and/or video data, biometric data, audio data may be collected from the same or a different device that collected the audio sample, the video sample, or the audio/video sample.

The network server 210 trains, using machine learning and the training data, a model that is configured to receive a given item of media content and output data indicating whether the given item of media content includes deepfake content (820).

The network server 210 may use various types of machine learning techniques. Those techniques may include supervised learning, unsupervised learning, semi-supervised learning, reinforcement learning, deep learning, self learning, feature learning, sparse dictionary learning, anomaly detection, robot learning, and/or association rules. The model may use artificial neural networks, decision trees, support vector machines, regression analysis, Bayesian networks, and/or genetic algorithms.

The data that the model is configured to receive is based on the training data. If the training data includes audio samples, then the model is trained to receive audio samples. If the training data includes blood pressure data and video data, then the model is trained to receive blood pressure data and video data. In some implementations, the network server 210 may train the model using the audio samples, the video samples, or the audio/video samples without using the additional data.

The network server 210 provides, for output to a first computing device, the model (830). The first computing device may be similar to client device 204 of FIG. 2. The network server 210 may provide the model and instructions on what type of data the model is configured to receive. For example, if the model is configured to receive a voicemail files, then the network server 210 may provide instructions to the first computing device indicating that the model is configured to receive voicemail files. If the model is configured to receive streaming data, then the network server 210 may provide instructions to the first computing device indicating how to provide the streaming data to the model. The instructions may indicate to provide the media content cumulatively to the model such that model receives any new data along with previous media content. The network server 210 may also indicate whether the model is configured to receive any sensor data, such as pulse data, location data, and any other similar data. The network server 210 includes instructions how to provide the sensor data to the model. For example, the instructions may indicate to provide the sensor data cumulatively to the model.

The network server 210 receives, from a second computing device, a data stream of an item of media content (840). The second computing device may be similar to computing device 208 of FIG. 2. A user of the second computing device may be communicating with a user of the first computing device. The item of media content may include the data exchanged between the two users. The data stream may be in the form of voice data from a voice call, video data from a video call, textual data from a messaging conversation, or any other similar data. The network server 210 may continuously receive the data stream from the second computing device.

The network server 210 receives, from the second computing device and from a third computing device, second computing device sensor data and third computing device sensor data (850). In addition to the sensors that detect the audio or video of the user, the second computing device may include additional sensors. The additional sensors may include an additional camera, an additional microphone, a GPS receiver, an accelerometer, a gravity sensor, an ambient light sensor, a magnetometer, a proximity sensor, and/or a gyroscope. One or more of these additional sensors may provide sensor data to the network server 210. The additional sensors may collect the data before, during, and/or after the second computing device collects, generates, and/or transmits any portion of the data stream of the item of media content.

The network server 210 may also receive sensor data from a third computing device. This third computing device may be any other computing device that is configured to collect data before, during, and/or after the second computing device collects, generates, and/or transmits any portion of the data stream of the item of media content. The third computing device may be similar to the watch 226. The third computing device may collect the sensor data before, during, and/or after the second computing device collects, generates, and/or transmits any portion of the data stream of the item of media content. The third computing device may include a blood pressure sensor, a pulse monitor, a thermometer, an optical heart sensor, an electrical heart sensor, an additional camera, an additional microphone, a GPS receiver, an accelerometer, a gravity sensor, an ambient light sensor, a magnetometer, a proximity sensor, and/or a gyroscope. In some implementations, the third computing device may collect and/or transmit the sensor data to the network server 210 in response to an instruction from the user. In some implementations, the third computing device may receive a request from the second computing device to collect and/or transmit the sensor data. In this case, the third computing device may request permission from the user before collecting and/or transmitting the sensor data.

The network server 210 accesses location data that reflects a location of the second computing device (860). The network server 210 may include a mobility manager that monitors the location of the first computing device. The location data may include a base station that the second computing device is connected to, a GPS location of the second computing device, and/or a triangulated location of the second computing device. The location data may also include historical location data that indicates the past locations where the second computing device was located.

The network server 210 provides, for output to the first computing device, the data stream, the second computing device sensor data, the third computing device sensor data media, and the location data (870). In addition to transmitting the data stream to the first computing device, the network server 210 provides the sensor data and the location data as the network server 210 receives the sensor data and location data from the second and third computing devices. In some implementations, the network server 210 may include timing data to indicate to the first computing device which portions of the data stream correspond to which portions of the sensor data and location data.

The first computing device receives the data stream, the second computing device sensor data, the third computing device sensor data media, and/or the location data and provides the received data to the model. In some instances, the first computing device selects the appropriate model based on the type of data in the data stream and the type of sensor data. The first computing device may provide the recently received data along with the previously received data to the model. For example, first computing device may be conducting a telephone call with a second computing device. The first computing device may continuously receive voice data from the second computing device through the network server 210. The first computing device may provide the recently received voice data and previously received voice data from the same telephone call to the model. For example, during a phone call that has lasted two minutes, the first computing device may receive additional voice data. The first computing device may provide the recently received additional voice data along with the previous two minutes of voice data to the model. The first computing device may provide this data to the model at various intervals, such as every five seconds or ten seconds. In some instances, the first computing device may provide the data once the model outputs data indicating whether the data stream includes deepfake content. As the communication between the first and second computing device continues, the model receives and processes data that increases in size each time the first computing device provides the model additional data. Because of this, the data output from the model indicating whether the data includes deepfake content may become more accurate and/or the validation score may indicate an increased level of confidence.

The network server 210 receives, from the first computing device, data confirming whether the data stream includes deepfake media content (880). The model generates data indicating whether the data stream includes deepfake content. The first computing device may generate a graphical interface that includes the data indicating whether the data stream includes deepfake content. That interface may prompt the user to confirm whether the data stream includes deepfake content. The user may confirm whether the data stream includes deepfake content by analyzing the data stream such as listening or viewing it. The user may attempt to communicate with the other user through a different communication channel to confirm that the other use is participating in the conversation. The user may provide data confirming whether the data stream includes deepfake content to the first computing device. The first computing device may provide that data to the network server 210.

Based on the data confirming whether the data stream includes deepfake content, the network server 210 updates, using machine learning, the model (890). The network server 210 may add the data stream to the training data. The network server 210 may include the data confirming whether the data stream includes deepfake content as a label to the training data. In the case where the network server 210 receives sensor data from the first computing device and/or the second computing device, the network server 210 may include that sensor data in the training data. With the addition of the data stream, the data confirming whether the item of media content includes deepfake content, and/or the sensor data, the network server 210 may retrain the model using machine learning. The network server 210 may use the updated model to determine whether any subsequent items of media content include deepfake content.

In some implementations, the network server 210 may add multiple data samples to the training data based on the data stream. Each sample may include various initial portions of the data stream, the sensor data, and the location data along with the label. The initial portions may increase in size until the network server 210 generates a portion that includes all or nearly all of the data stream. For example, a first data sample may include the first five seconds of the data stream, the sensor data, and the location data. The second sample may include the first ten seconds of the data stream, the sensor data, and the location data. The third sample may include the first fifteen seconds of the data stream, the sensor data, and the location data. The network server 210 may continue to generate data samples until the network server 210 reaches the end of the data stream.

Figure 9:
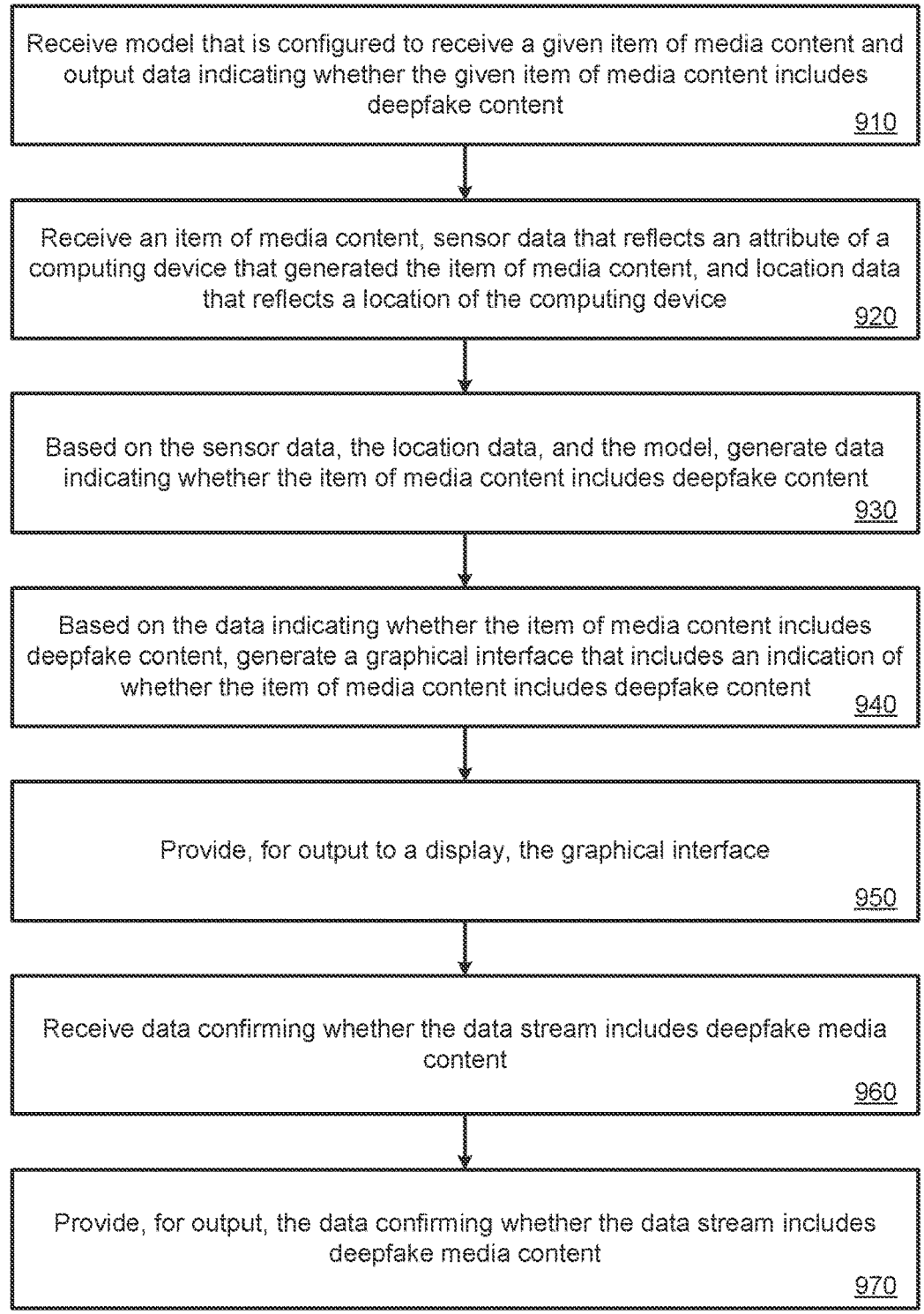

FIG. 9 is a flowchart of an example process 900 for identifying deepfake media content. In general, the process 900 receives a trained model that is configured to receive an item of media content and output data indicating whether the item of media content includes deepfake content. The process 900 receives an item of media content and other sensor data and uses the model to determine whether the item of media content includes deepfake content. The process 900 outputs data indicating whether the item of media content includes deepfake content. The process 900 will be described as being performed by the client device 204 of FIG. 2 and will include references to other components in FIG. 2. In some implementations, portions of the process 900 may be performed by the network server 110 of FIG. 1, the network server 210 of FIG. 2, the server 300 of FIG. 3, the server 400 of FIG. 4, and/or the client device 500 of FIG. 5.

The client device 204 receives a model that is configured to receive a given item of media content and output data indicating whether the given item of media content includes deepfake content (910). The client device 204 may receive the model from a device such as the network server 210 or any other similar device. The client device 204 may receive the model and instructions for what type of data the model is configured to receive. For example, if the model is configured to receive a voicemail file, then the network server 210 may provide instructions to the client device 204 indicating that the model is configured to receive voicemail files. If the model is configured to receive streaming data, then the network server 210 may provide instructions to the first computing device indicating how to provide the streaming data to the model. The instructions may indicate to provide the media content cumulatively to the model such that model receives any new data along with previous media content. The instructions may also indicate whether the model is configured to receive any sensor data, such as pulse data, location data, and any other similar data. The instructions may indicate how to provide the sensor data to the model. For example, the instructions may indicate to provide the sensor data cumulatively to the model.

The client device 204 receives an item of media content, sensor data that reflects an attribute of a computing device that generated the item of media content, and location data that reflects a location of the computing device (920). The client device 204 may receive the item of media content, the sensor data, and/or the location data from the network server 210. The network server 210 may have received the item of media content, the sensor data, and/or the location data from a device similar to the computing device 208, which may be the computing device that generated the item of media content. In some instances, the network server 210 may generate the location data. The client device may receive the media content, the sensor data, and/or the location data in a streaming fashion. For example, users of the client device 204 and the computing device 208 may be conducting a video call. The client device 204 and the computing device 208 may continuously exchange video data through the network server 210 during the video call. The client device 204 may receive timing data that indicates when the computing device 208 or other computing device collected the sensor data and when the computing device 208 or other computing device was at the location indicated by the computing device. The client device 204 may use the timing data to relate the portions of the item of media content to the sensor data and the location data. In some implementations, the item of media content may be a file that the client device 204 receives. For example, the file may be a voicemail, a video message, or any other similar file. The sensor data and the location data may reflect the attributes of the computing device 208 or another computing device while the computing device 208 received the voicemail, video message, or any other similar data.

Based on the sensor data, the location data, and the model, the client device 204 generates data indicating whether the item of media content includes deepfake content (930). The client device 204 provides the sensor data, the location data, and/or the item of media content to the model based on the received instructions. For a file, the client device 204 may provide the sensor data, the location data and the item of media content to the model once. For streaming data, the client device 204 may provide the sensor data, the location data and the item of media content to the model cumulatively at various intervals. In some implementations, the client device 204 may have received multiple models from the network server 210 and may select a model based on the sensor data, the location data, and the type of item of media content. In some implementations, the model may output binary data indicating whether the item of media content includes deepfake content. In some implementations, the model may output a validation score indicating a likelihood of whether the item of media content includes deepfake content.

Based on the data indicating whether the item of media content includes deepfake content, the client device 204 generates a graphical interface that includes an indication of whether the item of media content includes deepfake content (940). If the model generates a validation score, then graphical interface may include a red, yellow, or green indicator based on the range that validation score falls into. Red may indicate to the user that the item of media content almost certainly includes deepfake content. Yellow may indicate to the user that the item of media content may include deepfake content. Green may indicate to the user that the item of media content likely does not include deepfake content.

The client device 204 provides, for output to a display, the graphical interface (950). The graphical interface may be overlaid on the graphic that the client device 204 generates when the user consumes the item of media content. For a video call, phone call, messaging conversation, or other similar communication, the graphical interface may change during the communication based on data received from the model. For a voicemail, video message, or other similar file, the graphical interface may be static while the user is listening to or viewing the content.

The client device 204 receives data confirming whether the data stream includes deepfake media content (960). The user may confirm whether the file or data stream includes deepfake content by analyzing the file or data stream such as listening or viewing it. The user may attempt to communicate with the other user through a different communication channel to confirm that the other user is participating in the conversation. The user may provide data confirming whether the data stream includes deepfake content to the client device 204.

The client device 204 provides, for output, the data confirming whether the data stream includes deepfake media content (970). The client device 204 may provide the data confirming whether the data stream or file includes deepfake media content in response to a request from the network server 210. In some implementations, the client device 204 provides the data confirming whether the data stream or file includes deepfake media content automatically without the network server 210 requesting the data.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
accessing, by a computing device, historical data that includes data samples that each include a historical item of media content, a historical location of a historical computing device that received the historical item of media content, and a historical label indicating whether the historical item of media content includes deepfake content;
training, by the computing device, a model that is configured to receive a given item of media content and a given location of a given computing device that received the given item of media content and output data indicating whether the given item of media content includes deepfake content using machine learning and the data samples;
receiving, by the computing device, an item of media content, data identifying a location of a receiving computing device that received the item of media content, and data, from a user, indicating whether the item of media content includes deepfake content; and updating, by the computing device, the model by retraining the model using machine learning, the historical data, the item of media content, the data identifying the location of the receiving computing device that received the item of media content, and the data indicating whether the item of media content includes deepfake content.

2. The method of claim 1, comprising:
providing, by the computing device, the item of media content and the data identifying the location of the receiving computing device that received the item of media content as inputs to the model;
receiving, by the computing device and from the model, data indicating whether the item of media content likely includes deepfake content; and
providing, for output by the computing device and to the user, the item of media content and the data indicating whether the item of media content likely includes deepfake content,
wherein receiving the data, from the user, indicating whether the item of media content includes deepfake content is in response to providing, to the user, the item of media content and the data indicating whether the item of media content likely includes deepfake content.

3. The method of claim 1, wherein:
the data samples each include data identifying a historical computing device that generated the historical item of media content, and
receiving the item of media content, the data identifying the location of the receiving computing device that received the item of media content, and the data indicating whether the item of media content includes deepfake content comprises receiving data identifying a generating computing device that generated the item of media content.

4. The method of claim 1, wherein:
the data samples each include data identifying a historical computing device that received the historical item of media content, and
receiving the item of media content, the data identifying the location of the receiving computing device that received the item of media content, and the data indicating whether the item of media content includes deepfake content comprises receiving data identifying the receiving computing device.

5. The method of claim 1, wherein:
the data samples each include data identifying a historical location of a historical computing device that generated the historical item of media content, and
receiving the item of media content, the data identifying the location of the receiving computing device that received the item of media content, and the data indicating whether the item of media content includes deepfake content comprises receiving data identifying a location of a generating computing device that generated the item of media content.

6. The method of claim 1, wherein:
the data samples each include historical sensor data that reflects historical characteristics of a historical computing device that generated the historical item of media content, and
receiving the item of media content, the data identifying the location of the receiving computing device that received the item of media content, and the data indicating whether the item of media content includes deepfake content comprises receiving sensor data that reflects characteristics of a generating computing device that generated the item of media content.

7. The method of claim 1, wherein:
the data samples each include historical sensor data that reflects historical characteristics of the historical computing device that received the historical item of media content, and
receiving the item of media content, the data identifying the location of the receiving computing device that received the item of media content, and the data indicating whether the item of media content includes deepfake content comprises receiving sensor data that reflects characteristics of the receiving computing device.

8. A system, comprising:
one or more processors; and
memory including a plurality of computer-executable components that are executable by the one or more processors to perform a plurality of actions, the plurality of acts comprising:
accessing historical data that includes data samples that each include a historical item of media content, a historical location of a historical computing device that received the historical item of media content, and a historical label indicating whether the historical item of media content includes deepfake content;
training a model that is configured to receive a given item of media content and a given location of a given computing device that received the given item of media content and output data indicating whether the given item of media content includes deepfake content using machine learning and the data samples;
receiving an item of media content, data identifying a location of a receiving computing device that received the item of media content, and data, from a user, indicating whether the item of media content includes deepfake content; and
updating the model by retraining the model using machine learning, the historical data, the item of media content, the data identifying the location of the receiving computing device that received the item of media content, and the data indicating whether the item of media content includes deepfake content.

9. The system of claim 8, wherein the acts comprise:
providing the item of media content and the data identifying the location of the receiving computing device that received the item of media content as inputs to the model;
receiving, from the model, data indicating whether the item of media content likely includes deepfake content; and
providing, for output to the user, the item of media content and the data indicating whether the item of media content likely includes deepfake content,
wherein receiving the data, from the user, indicating whether the item of media content includes deepfake content is in response to providing, to the user, the item of media content and the data indicating whether the item of media content likely includes deepfake content.

10. The system of claim 8, wherein:
the data samples each include data identifying a historical computing device that generated the historical item of media content, and
receiving the item of media content, the data identifying the location of the receiving computing device that received the item of media content, and the data indicating whether the item of media content includes deepfake content comprises receiving data identifying a generating computing device that generated the item of media content.

11. The system of claim 8, wherein:
the data samples each include data identifying a historical computing device that received the historical item of media content, and
receiving the item of media content, the data identifying the location of the receiving computing device that received the item of media content, and the data indicating whether the item of media content includes deepfake content comprises receiving data identifying the receiving computing device.

12. The system of claim 8, wherein:
the data samples each include data identifying a historical location of a historical computing device that generated the historical item of media content, and
receiving the item of media content comprises, the data identifying the location of the receiving computing device that received the item of media content, and the data indicating whether the item of media content includes deepfake content receiving data identifying a location of a generating computing device that generated the item of media content.

13. The system of claim 8, wherein:
the data samples each include historical sensor data that reflects historical characteristics of a historical computing device that generated the historical item of media content, and
receiving the item of media content, the data identifying the location of the receiving computing device that received the item of media content, and the data indicating whether the item of media content includes deepfake content comprises receiving sensor data that reflects characteristics of a generating computing device that generated the item of media content.

14. The system of claim 8, wherein:
the data samples each include historical sensor data that reflects historical characteristics of the historical computing device that received the historical item of media content, and
receiving the item of media content, the data identifying the location of the receiving computing device that received the item of media content, and the data indicating whether the item of media content includes deepfake content comprises receiving sensor data that reflects characteristics of the receiving computing device.

15. One or more non-transitory computer-readable media of a computing device storing computer-executable instructions that upon execution cause one or more processors to perform acts comprising:
accessing historical data that includes data samples that each include a historical item of media content, a historical location of a historical computing device that received the historical item of media content, and a historical label indicating whether the historical item of media content includes deepfake content;
training a model that is configured to receive a given item of media content and a given location of a given computing device that received the given item of media content and output data indicating whether the given item of media content includes deepfake content using machine learning and the data samples;
receiving an item of media content, data identifying a location of a receiving computing device that received the item of media content, and data, from a user, indicating whether the item of media content includes deepfake content; and
updating the model by retraining the model using machine learning, the historical data, the item of media content, the data identifying the location of the receiving computing device that received the item of media content, and the data indicating whether the item of media content includes deepfake content.

16. The media of claim 15, wherein the acts comprise:
providing the item of media content and the data identifying the location of the receiving computing device that received the item of media content as inputs to the model;
receiving, from the model, data indicating whether the item of media content likely includes deepfake content; and
providing, for output to the user, the item of media content and the data indicating whether the item of media content likely includes deepfake content,
wherein receiving the data, from the user, indicating whether the item of media content includes deepfake content is in response to providing, to the user, the item of media content and the data indicating whether the item of media content likely includes deepfake content.

17. The media of claim 15, wherein:
the data samples each include data identifying a historical location of a historical computing device that generated the historical item of media content, and
receiving the item of media content comprises, the data identifying the location of the receiving computing device that received the item of media content, and the data indicating whether the item of media content includes deepfake content receiving data identifying a location of a generating computing device that generated the item of media content.

18. The media of claim 15, wherein:
the data samples each include historical sensor data that reflects historical characteristics of a historical computing device that generated the historical item of media content, and
receiving the item of media content, the data identifying the location of the receiving computing device that received the item of media content, and the data indicating whether the item of media content includes deepfake content comprises receiving sensor data that reflects characteristics of a generating computing device that generated the item of media.

19. The media of claim 15, wherein:
the data samples each include data identifying a historical computing device that received the historical item of media content, and
receiving the item of media content, the data identifying the location of the receiving computing device that received the item of media content, and the data indicating whether the item of media content includes deepfake content comprises receiving data identifying the receiving computing device.

20. The media of claim 15, wherein:
the data samples each include data identifying a historical location of a historical computing device that generated the historical item of media content, and
receiving the item of media content, the data identifying the location of the receiving computing device that received the item of media content, and the data indicating whether the item of media content includes deepfake content comprises receiving data identifying a location of a generating computing device that generated the item of media content.

\* \* \* \* \*